US011153800B2

United States Patent
Liou et al.

(10) Patent No.: US 11,153,800 B2
(45) Date of Patent: Oct. 19, 2021

(54) METHOD AND APPARATUS FOR USER EQUIPMENT (UE) MONITORING BEHAVIOR FOR BEAM RECOVERY IN A WIRELESS COMMUNICATION SYSTEM

(71) Applicant: ASUSTek Computer Inc., Taipei (TW)

(72) Inventors: Jia-Hong Liou, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/193,751

(22) Filed: Nov. 16, 2018

(65) Prior Publication Data

US 2019/0159100 A1  May 23, 2019

Related U.S. Application Data

(60) Provisional application No. 62/587,908, filed on Nov. 17, 2017.

(51) Int. Cl.
*H04W 36/30* (2009.01)
*H04W 72/04* (2009.01)
(Continued)

(52) U.S. Cl.
CPC ........ *H04W 36/305* (2018.08); *H04B 7/0408* (2013.01); *H04B 7/0617* (2013.01); *H04B 7/088* (2013.01); *H04L 1/0025* (2013.01); *H04L 1/0026* (2013.01); *H04L 5/0048* (2013.01); *H04L 5/0051* (2013.01); *H04L 5/0091* (2013.01); *H04W 72/042* (2013.01); *H04L 1/1671* (2013.01); *H04L 1/20* (2013.01)

(58) Field of Classification Search
CPC .............. H04W 36/305; H04W 72/042; H04B 7/0408; H04B 7/0617; H04B 7/088; H04L 1/0025; H04L 1/0026; H04L 1/1671; H04L 1/20; H04L 5/0048; H04L 5/0051; H04L 5/91
See application file for complete search history.

(56) References Cited

U.S. PATENT DOCUMENTS

2018/0138962 A1* 5/2018 Islam .................... H04L 5/0048
2018/0234959 A1* 8/2018 Ahn .................... H04W 72/046
(Continued)

OTHER PUBLICATIONS

Gao et al. "Method and apparatus for beam recovery in next generation wireless systems", Nov. 16, 2017, Samsung Electronics Co. Ltd., U.S. Appl. No. 62/587,210, pp. 1-43 (Year: 2017).*
(Continued)

*Primary Examiner* — Un C Cho
*Assistant Examiner* — Shah M Rahman
(74) *Attorney, Agent, or Firm* — Skaar Ulbrich Macari, P.A.

(57) ABSTRACT

A method and apparatus are disclosed from the perspective of a UE (User Equipment). In one embodiment, the method includes the UE receiving and/or monitoring a first control region via a first link. The method further includes the UE transmitting a first request if the first link fails. The method also includes the UE receiving and/or monitoring a second control region for a response via a second link within a time window associated with the first request. In addition, the method includes the UE receiving and/or monitoring the first control region after the time window associated with the first request is over.

16 Claims, 27 Drawing Sheets

(51) Int. Cl.
  *H04B 7/08* (2006.01)
  *H04B 7/06* (2006.01)
  *H04L 1/00* (2006.01)
  *H04L 5/00* (2006.01)
  *H04B 7/0408* (2017.01)
  *H04L 1/16* (2006.01)
  *H04L 1/20* (2006.01)

(56) References Cited

U.S. PATENT DOCUMENTS

| | | | | |
|---|---|---|---|---|
| 2018/0302889 A1* | 10/2018 | Guo | ............... | H04W 72/046 |
| 2018/0368009 A1* | 12/2018 | Xia | ............... | H04W 72/0453 |
| 2019/0037423 A1* | 1/2019 | Yu | ............... | H04W 74/0833 |
| 2019/0053288 A1* | 2/2019 | Zhou | ............... | H04L 5/0091 |
| 2019/0053293 A1* | 2/2019 | Akoum | ............... | H04W 76/19 |
| 2019/0053294 A1* | 2/2019 | Xia | ............... | H04W 72/0413 |
| 2019/0058517 A1* | 2/2019 | Kang | ............... | H04B 7/0456 |
| 2019/0074882 A1* | 3/2019 | Zhou | ............... | H04W 16/32 |
| 2019/0081675 A1* | 3/2019 | Jung | ............... | H04W 56/001 |
| 2019/0081753 A1* | 3/2019 | Jung | ............... | H04B 7/0617 |
| 2019/0082334 A1* | 3/2019 | Nagaraja | ............... | H04W 24/04 |
| 2019/0082335 A1* | 3/2019 | Yu | ............... | H04W 76/19 |
| 2019/0089447 A1* | 3/2019 | Sang | ............... | H04W 36/00837 |
| 2019/0090143 A1* | 3/2019 | Luo | ............... | H04B 7/088 |
| 2019/0116605 A1* | 4/2019 | Luo | ............... | H04B 7/15542 |
| 2019/0149305 A1* | 5/2019 | Zhou | ............... | H04B 7/0626 |
| | | | | 370/330 |
| 2019/0182884 A1* | 6/2019 | Deenoo | ............... | H04L 1/0061 |
| 2019/0261344 A1* | 8/2019 | Grant | ............... | H04B 7/022 |
| 2020/0245395 A1* | 7/2020 | Zhang | ............... | H04L 5/0053 |
| 2020/0252180 A1* | 8/2020 | Takeda | ............... | H04W 72/04 |
| 2020/0288334 A1* | 9/2020 | Takeda | ............... | H04L 27/26 |
| 2020/0373990 A1* | 11/2020 | Da Silva | ............... | H04W 74/0833 |
| 2021/0076445 A1* | 3/2021 | Tsai | ............... | H04W 76/19 |

OTHER PUBLICATIONS

CATT, "Consideration on beam failure recovery", 3GPP TSG RAN WG1 Meeting 90bis R1-1717813 Prague, CZ, Oct. 9-13, 2017.
MediaTek Inc, "Design Details on Beam Failure Recovery", 3GFP TSG RAN WG1 Meeting #90bis R1-1718334 Prague, Czechia, Oct. 9-13, 2017
MediaTek Inc.,"Summary for Remaing issues on Beam Failure Recovery", 3GPF TSG RAN WG1 Meeting #90b R1-1718878 Prague, Czechia, Oct. 9-13, 2017.
MediaTek Inc: "Design Details on Beam Failure Recovery", 3GPP Draft; R1-1718334 Beamrecovery Final, 3rd Generation Partnership Project (3GPP), Mobile Competence Centre ; 650, Route Des Lucioles ; F-06921 Sophia-Antipolis Cedex ;France vol. RAN WG1, No. Prague, Czechia; Oct. 9, 2017-Oct. 13, 2017, Oct. 8, 2017 (Oct. 8, 2017), XP051341517, Retrieved from the Internet: URL:http://www.3gpp.org/ftp/Meetings_3GPP_SYNC/RAN1/Docs/.
European Search Report in corresponding EP Application No. 18206698.5, dated Mar. 20, 2019.

* cited by examiner (a) Digital beamforming (b) Analogue beamforming (c) Hybrid beamforming: Left = fully connected, Right = sub-array

METHOD AND APPARATUS FOR USER EQUIPMENT (UE) MONITORING BEHAVIOR FOR BEAM RECOVERY IN A WIRELESS COMMUNICATION SYSTEM

CROSS-REFERENCE TO RELATED APPLICATIONS

The present Application claims the benefit of U.S. Provisional Patent Application Ser. No. 62/587,908 filed on Nov. 17, 2017, the entire disclosure of which is incorporated herein in its entirety by reference.

FIELD

This disclosure generally relates to wireless communication networks, and more particularly, to a method and apparatus for user equipment monitoring behavior for beam recovery in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE receiving and/or monitoring a first control region via a first link. The method further includes the UE transmitting a first request if the first link fails. The method also includes the UE receiving and/or monitoring a second control region for a response via a second link within a time window associated with the first request. In addition, the method includes the UE receiving and/or monitoring the first control region after the time window associated with the first request is over.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93bis #23][NR] Deployment scenarios", NTT DOCOMO, INC.; 3GPP RAN2 #94 meeting minute; R2-162251, "RAN2 aspects of high frequency New RAT", Samsung; TS 36.213 V14.3.0, "E-UTRA Physical layer procedures"; TS 36.212 V14.3.0, "E-UTRA Multiplexing and channel coding"; TS 36.211 V14.3.0, "E-UTRA Physical channels and modulation"; Final Report of 3GPP TSG RAN WG1 #85 v1.0.0 (Nanjing, China, 23-27 May 2016); Final Report of 3GPP TSG RAN WG1 #86 v1.0.0 (Gothenburg, Sweden, 22-26 Aug. 2016); Final Report of 3GPP TSG RAN WG1 #86bis v1.0.0 (Lisbon, Portugal, 10-14 Oct. 2016); Final Report of 3GPP TSG RAN WG1 #87 v1.0.0 (Reno, USA, 14-18 Nov. 2016); Final Report of 3GPP TSG RAN WG1 #AH1_NR v1.0.0 (Spokane, USA, 16-20 Jan. 2017); Final Report of 3GPP TSG RAN WG1 #88 v1.0.0 (Athens, Greece, 13-17 Feb. 2017); Final Report of 3GPP TSG RAN WG1 #88bis v1.0.0 (Spokane, USA, 3-7 Apr. 2017); Final Report of 3GPP TSG RAN WG1 #89 v1.0.0 (Hangzhou, China, 15-19 May 2017); Final Report of 3GPP TSG RAN WG1 #AH_NR2 v1.0.0 (Qingdao, China, 27-30 Jun. 2017); Final Chairman's Note of 3GPP TSG RAN WG1 Meeting #90 (Prague, Czech Republic, 21-25 Aug. 2017); Final Chairman's Note of 3GPP TSG RAN WG1 Meeting #AH_NR3 (Nagoya, Japan, 18-21 Sep. 2017); and Final Chairman's Note of 3GPP TSG RAN WG1 Meeting #90bis (Prague, Czech Republic, 9-13 Oct. 2017) (updated with email approvals). The standards and documents listed above are hereby expressly incorporated by reference in their entirety.

Figure 1:
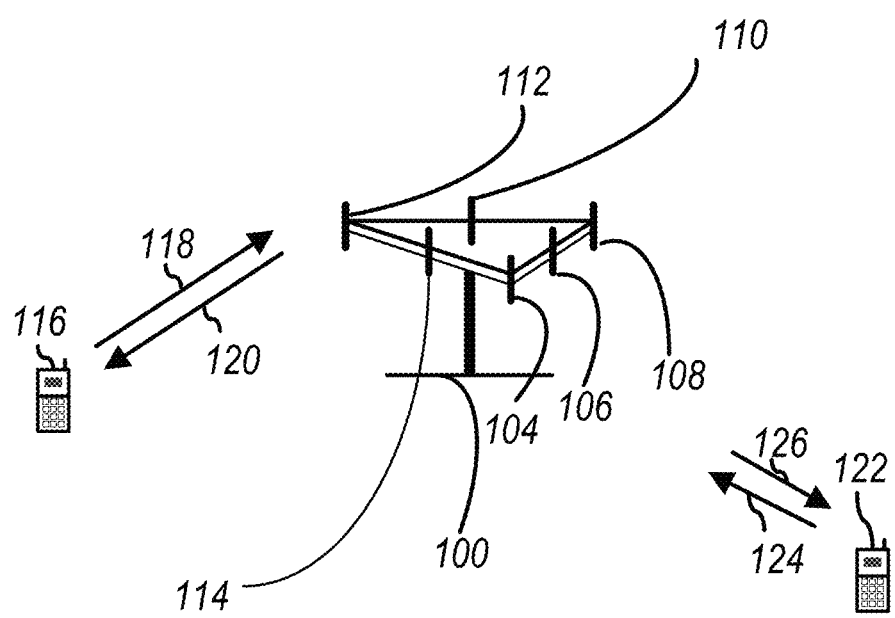
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
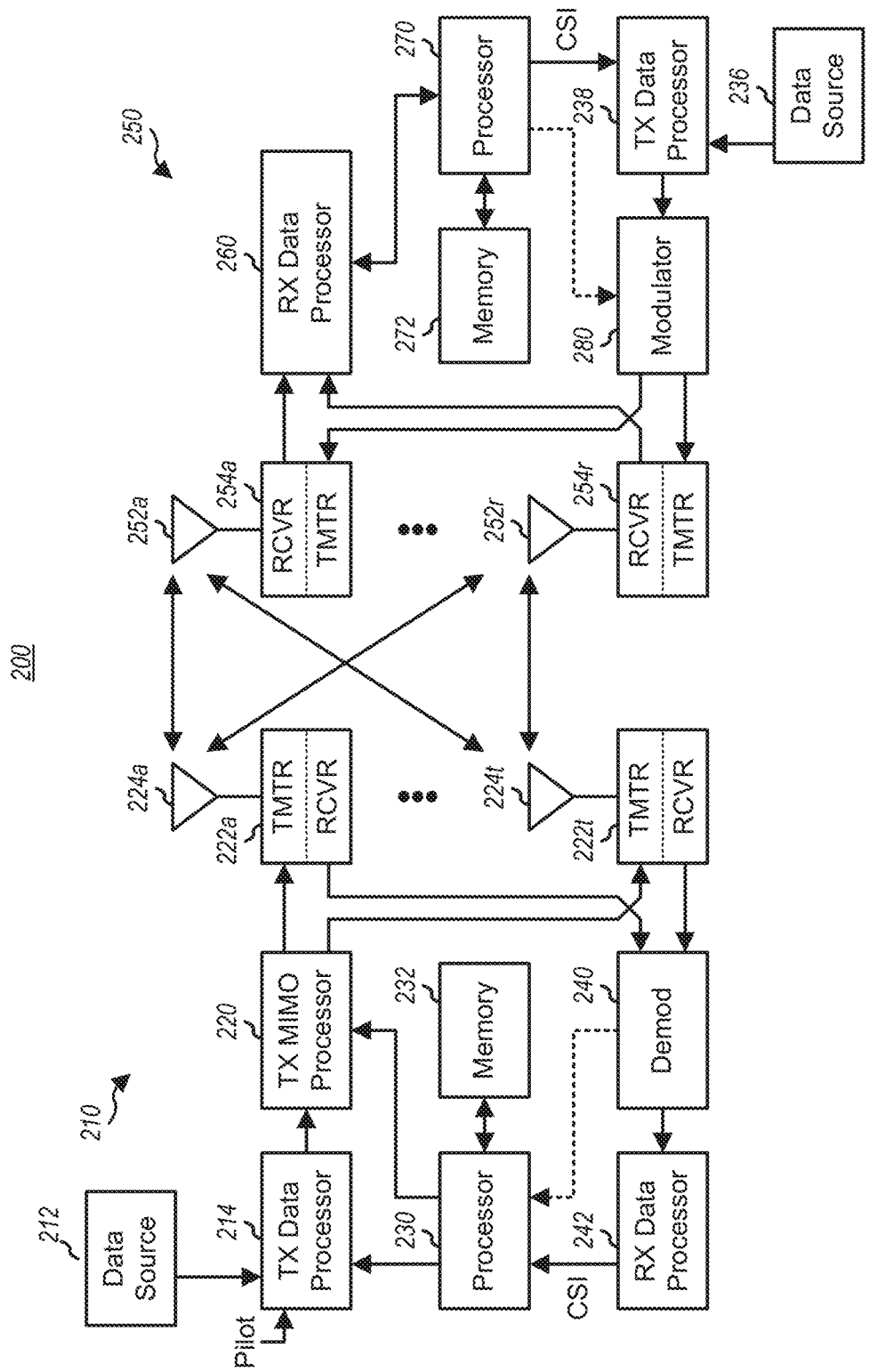
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
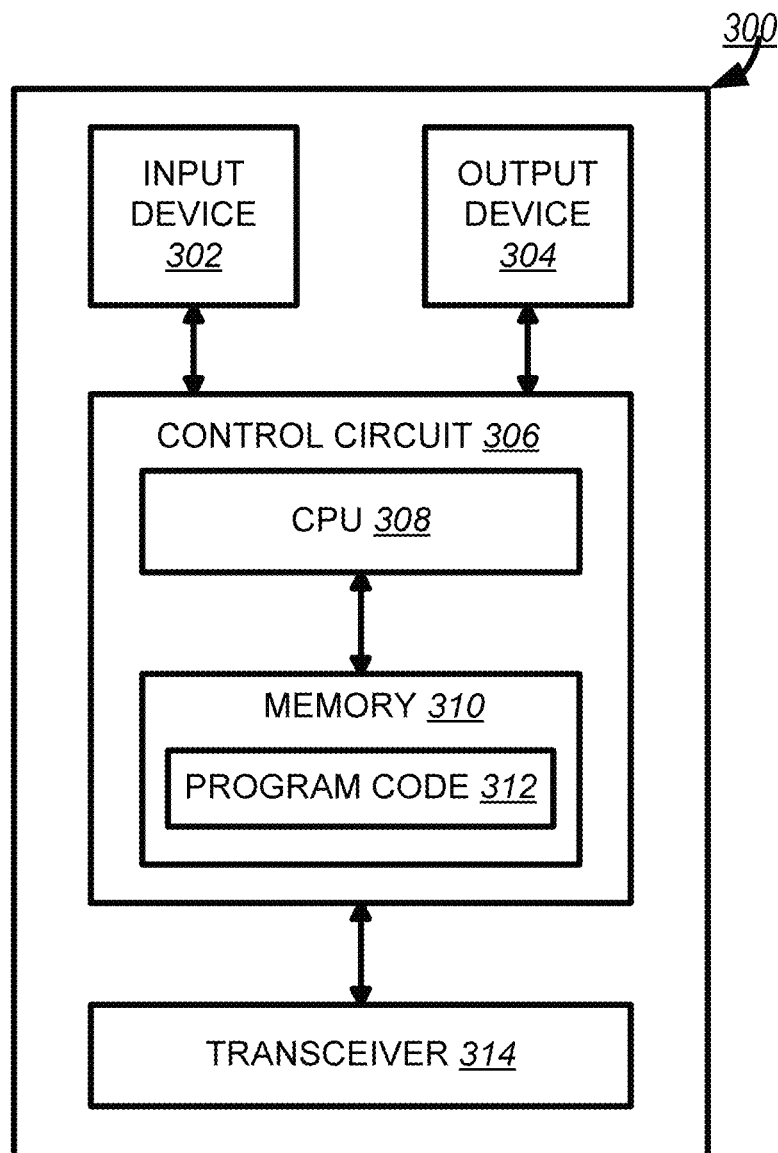
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
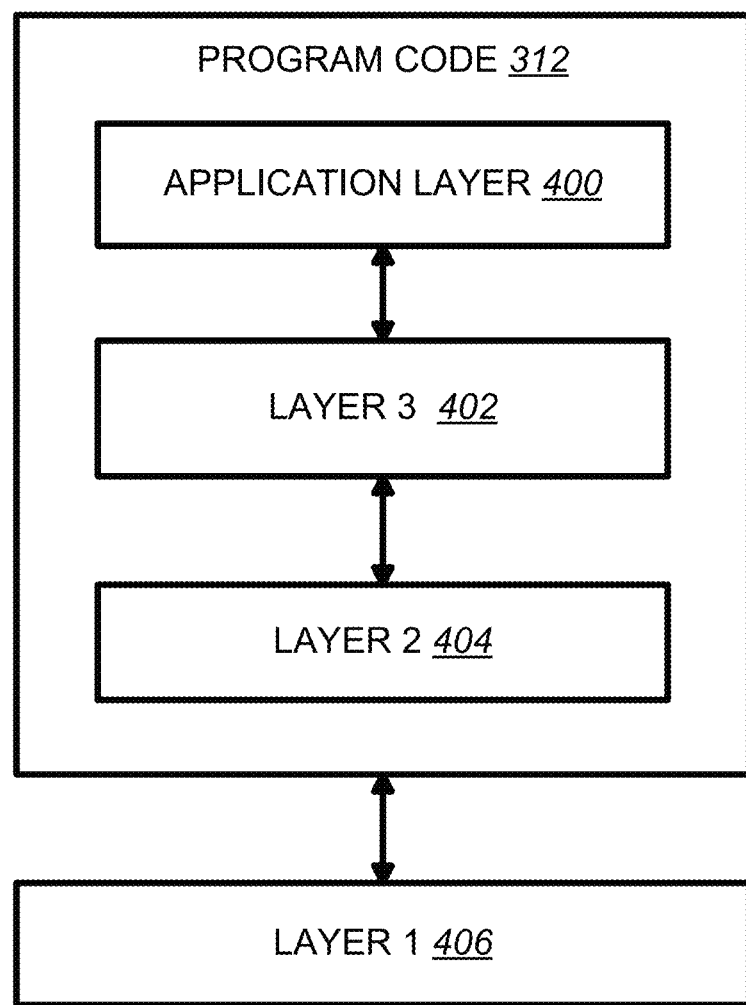
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:

eMBB (enhanced Mobile Broadband)
mMTC (massive Machine Type Communications)
URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g., current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams being narrow compared to a wide sector beam, multiple beams for transmitting downlink common channels are needed to cover the required cell area. The number of concurrent high gain beams that access point is able to form may be limited by the cost and complexity of the utilized transceiver architecture. In practice, in higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be generally categorized into three types of implementation: digital beamforming, hybrid beamforming, and analog beamforming. For digital beamforming, the beam is generated on the digital domain, i.e. the weighting of each antenna element can be controlled by baseband (e.g. connected to a TXRU (Transceiver Units)). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

For Analog beamforming, the beam is generated on the analog domain, i.e. the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beams generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain.

Figure 5A:
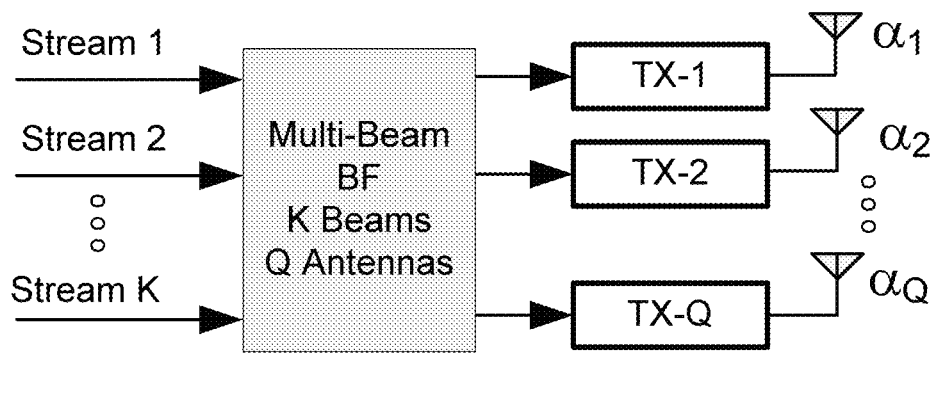
FIGS. 5A-5C provide exemplary illustrations of three types of beamforming.
Figure 5B:
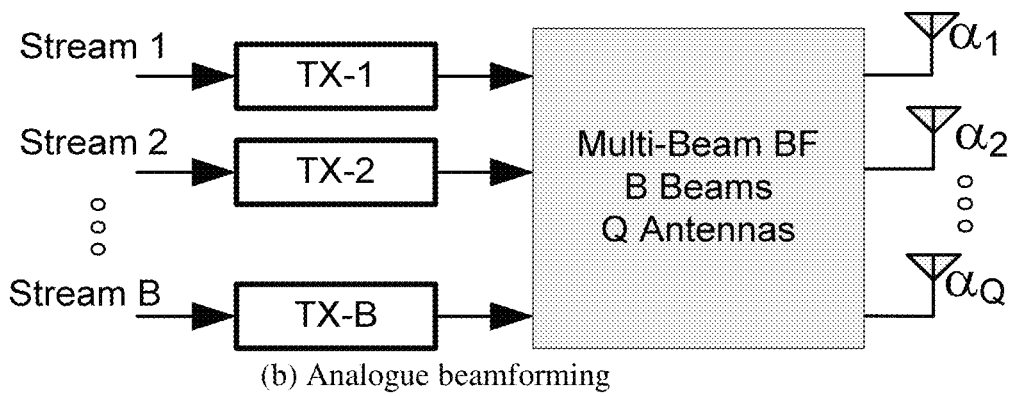
Figure 5C:
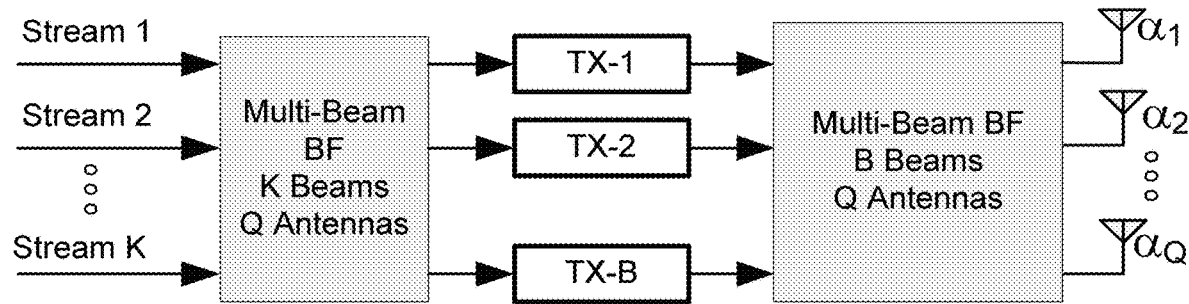
Figure 5C:
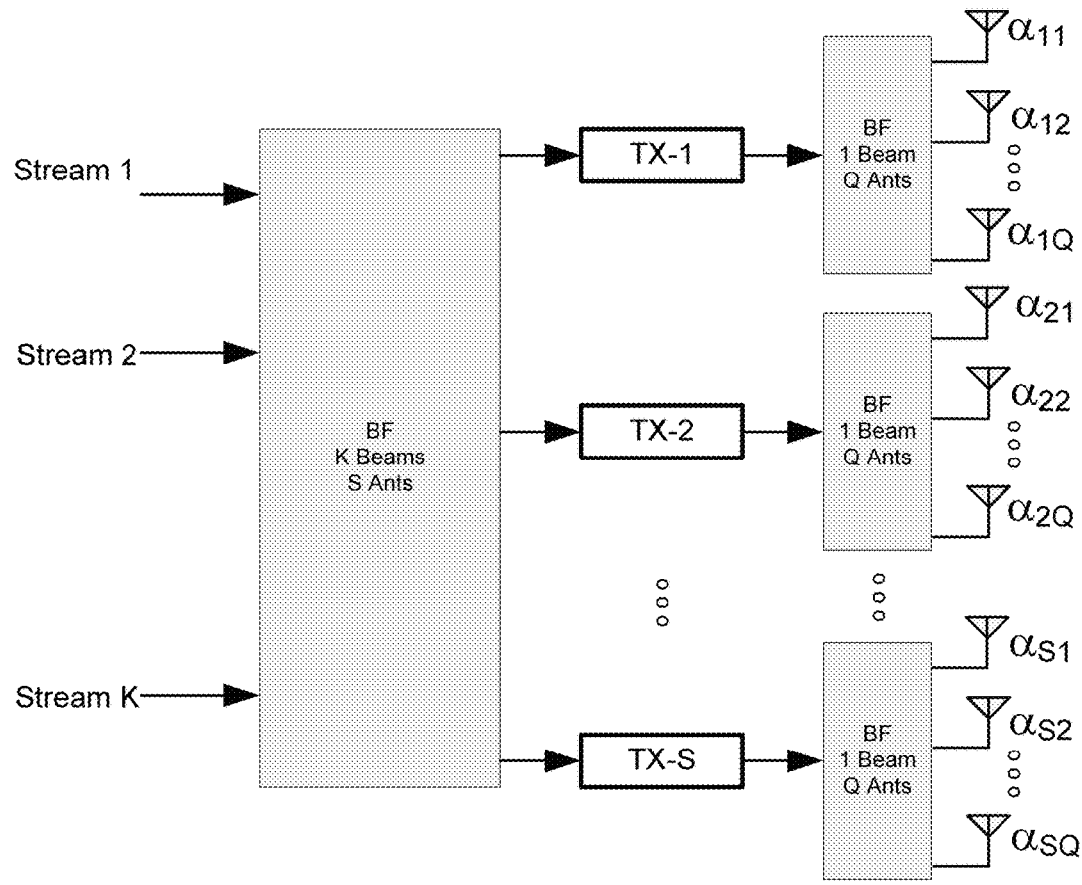

FIGS. 5A-5C provide exemplary illustrations of the three types of beamforming.

Figure 6:
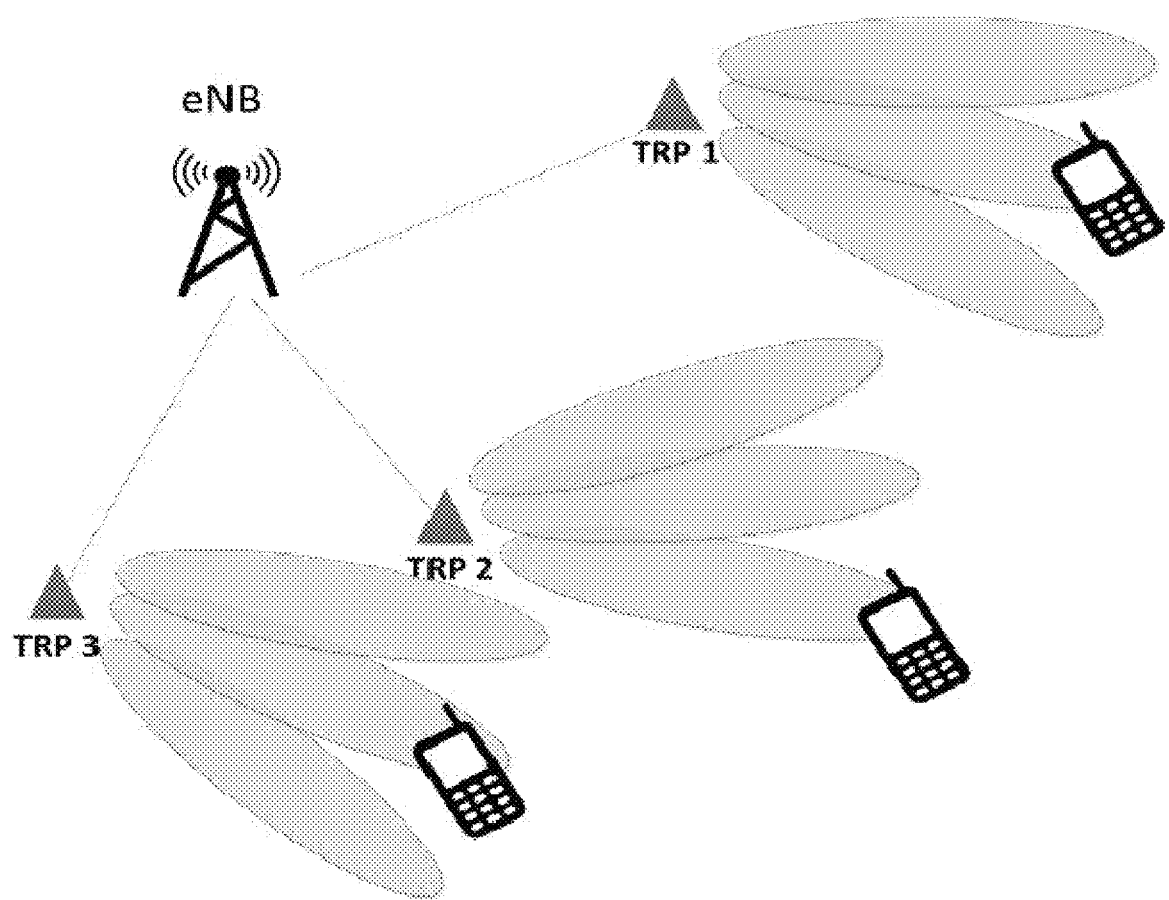
FIG. 6 is a reproduction of FIG. 1 of 3GPP R2-162709.

Based on 3GPP R2-162709 and as shown in FIG. 6, an eNB may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility type for NR can be listed as follows:
Intra-TRP mobility
Inter-TRP mobility
Inter-NR eNB mobility Based on 3GPP R2-162762, reliability of a system purely relying on beamforming and operating in higher frequencies might be challenging, since the coverage might be more sensitive to both time and space variations. As a consequence of that the SINR (Signal to Interference Plus Noise Ratio) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Figure 7:
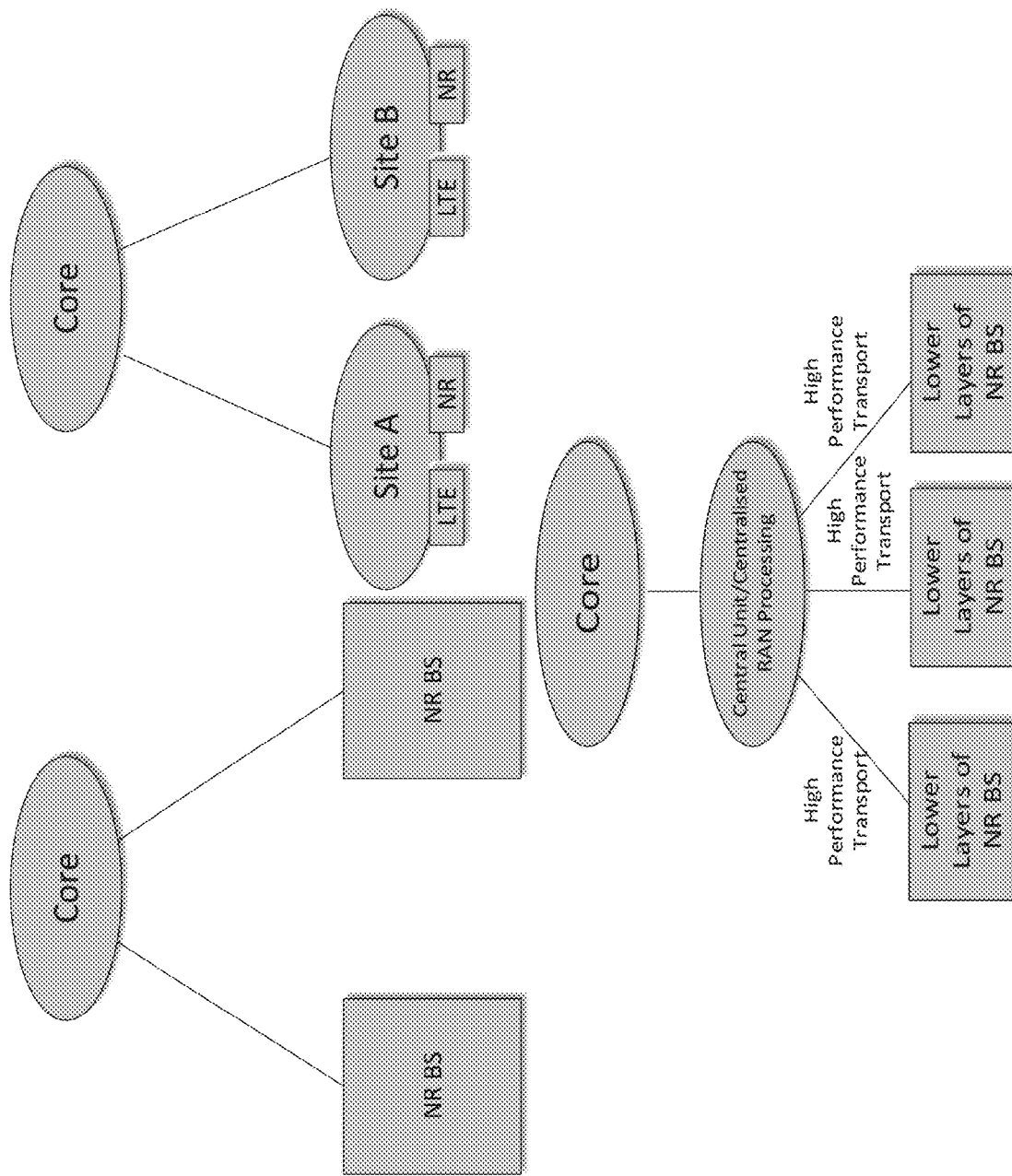
FIGS. 7 and 8 are reproduction of figures of 3GPP R2-160947.
Figure 8:
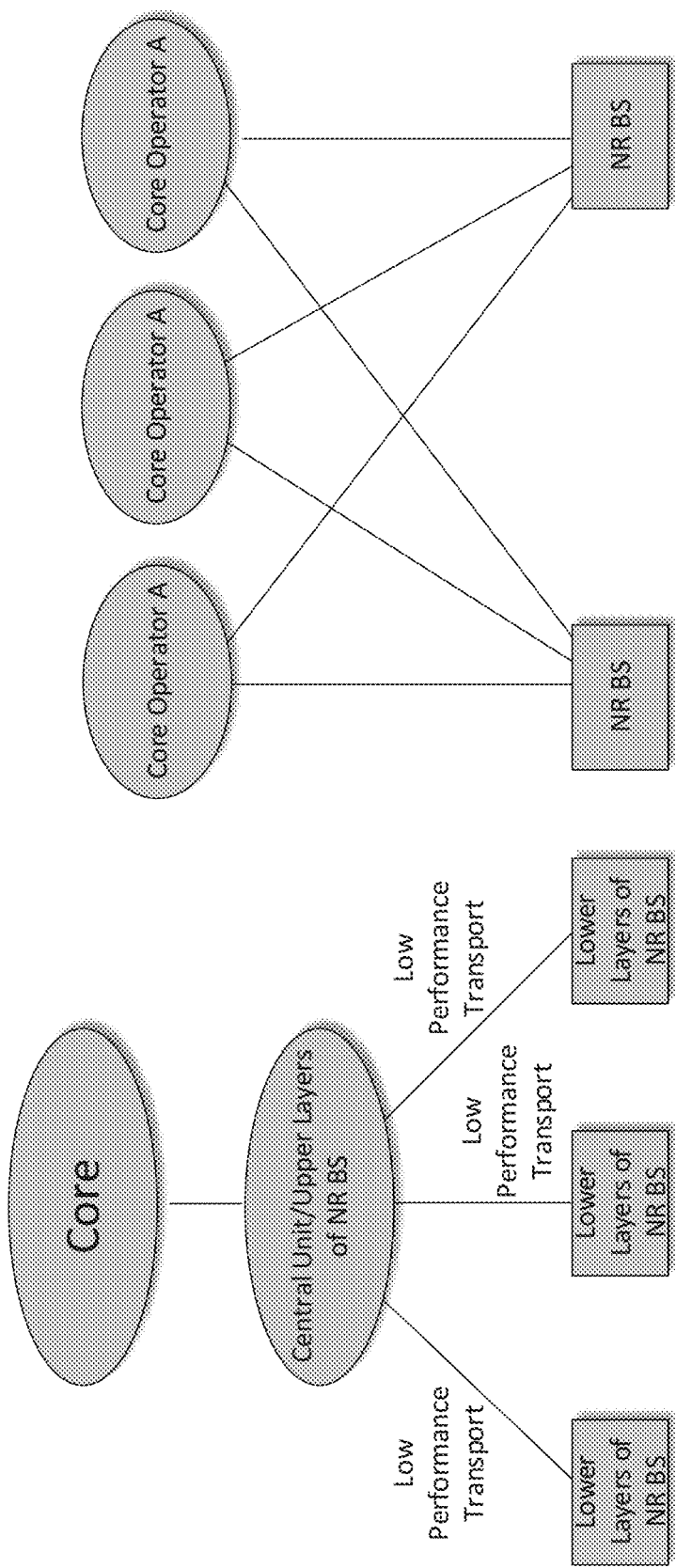

Based on 3GPP R3-160947, the scenarios illustrated in FIGS. 7 and 8 should be considered for support by the NR radio network architecture.

Based on 3GPP R2-164306, the following scenarios in terms of cell layout for standalone NR are captured to be studied:
Macro cell only deployment
Heterogeneous deployment
Small cell only deployment Based on 3GPP RAN2 #94 meeting minutes, 1 NR eNB corresponds to 1 or many TRPs. Two levels of network controlled mobility:
RRC driven at "cell" level.
Zero/Minimum RRC involvement (e.g. at MAC/PHY)

Figure 9:
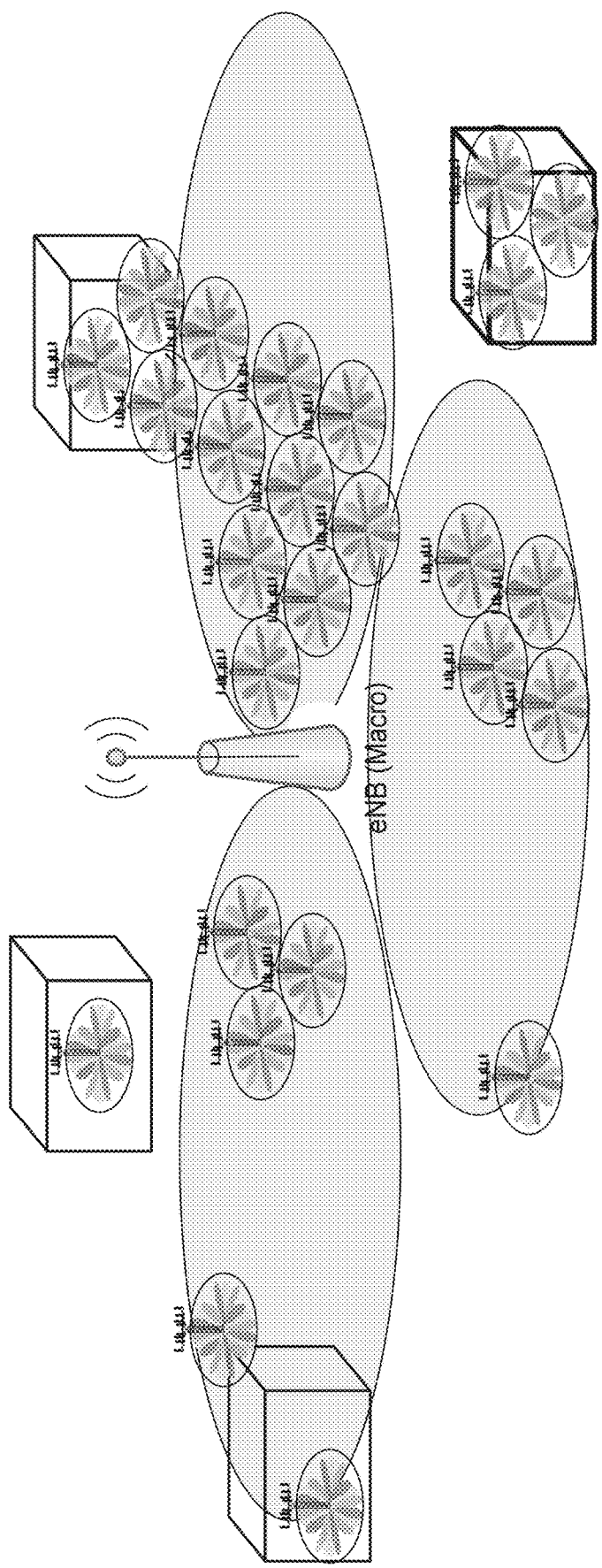
FIG. 9 shows an exemplary deployment with single TRP cell.
Figure 10:
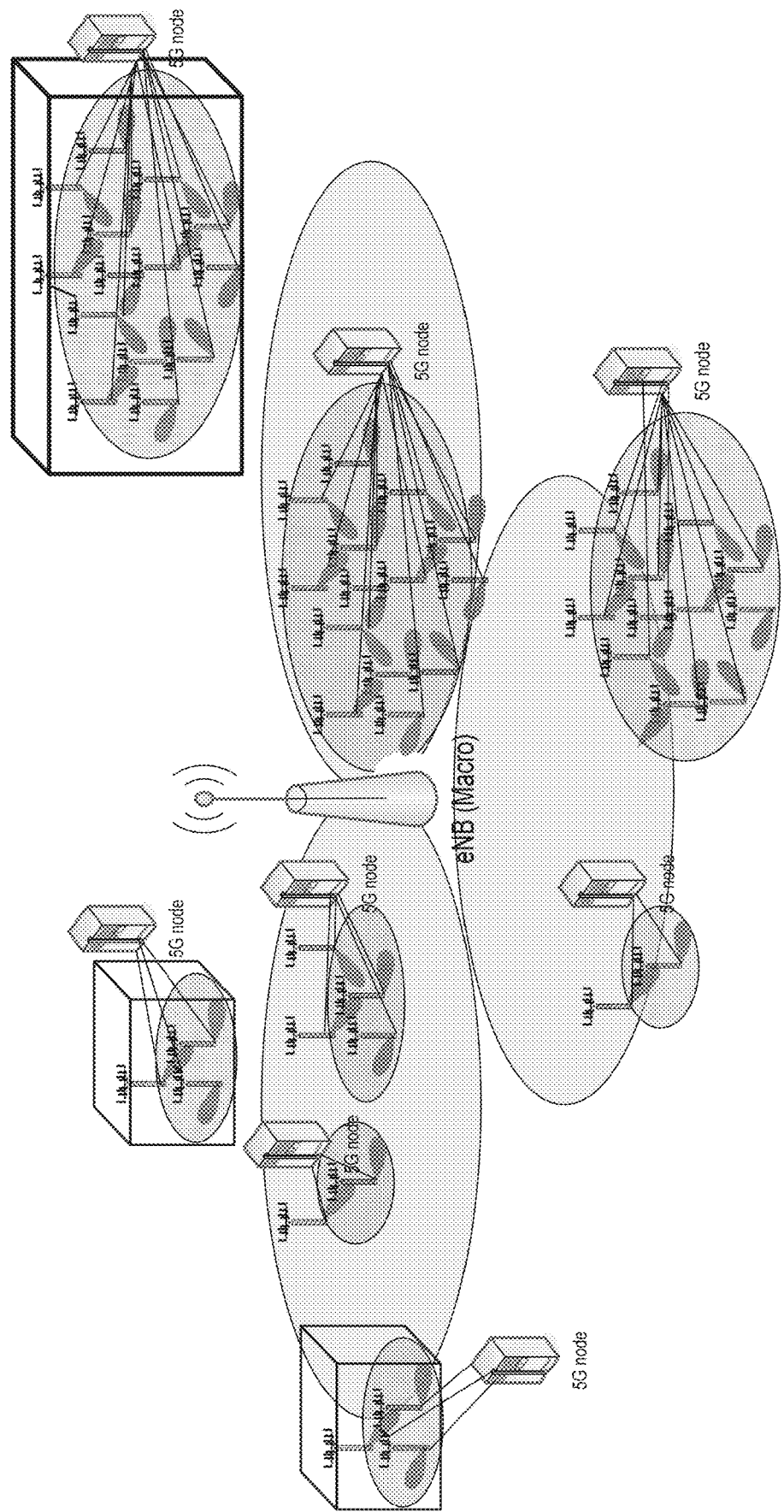
FIG. 10 shows an exemplary deployment with multiple TRP cells.
Figure 11:
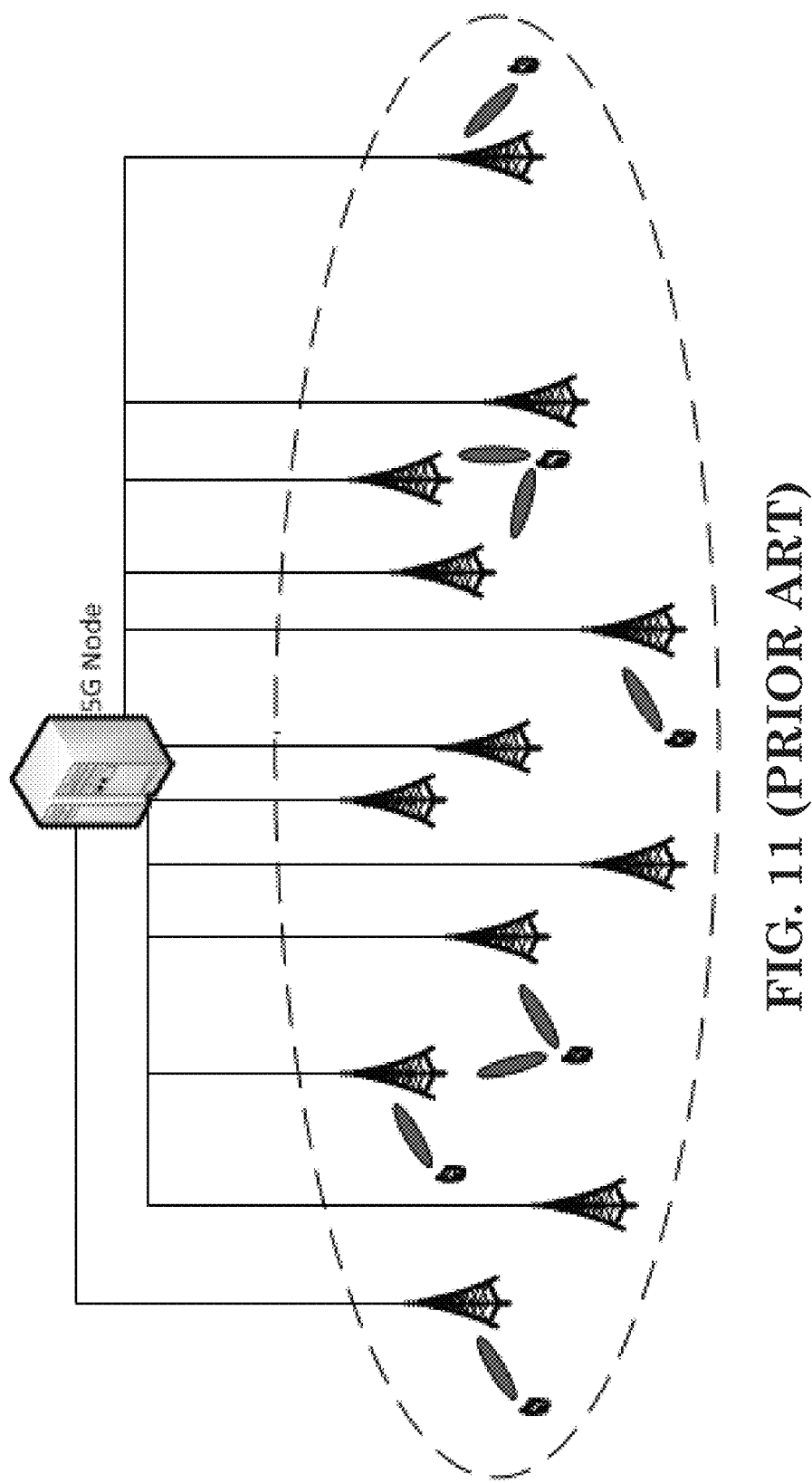
FIG. 11 shows an exemplary 5G cell comprising a 5G node with multiple TRPs.
Figure 12:
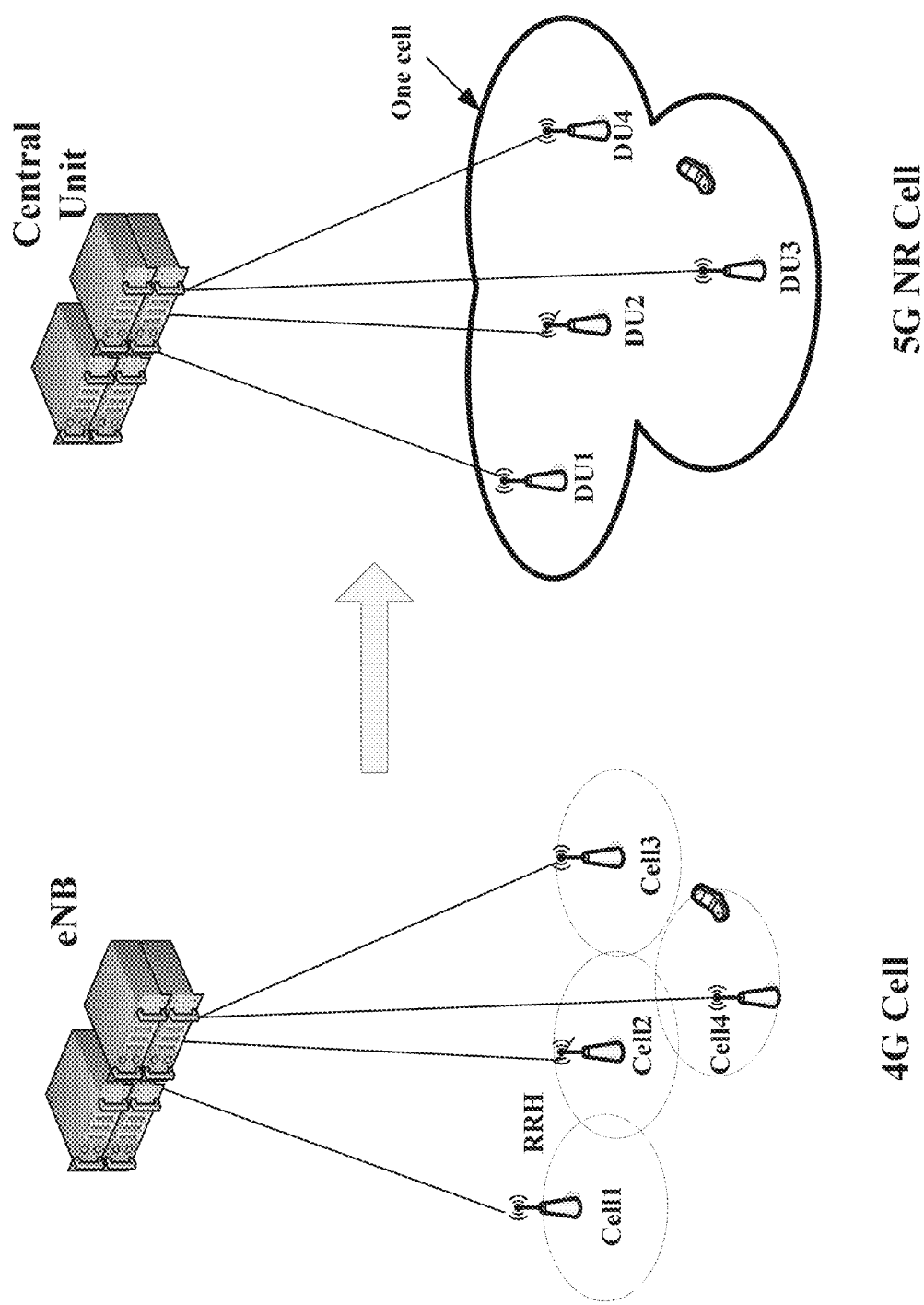
FIG. 12 shows an exemplary comparison between a LTE cell and a NR cell.

FIGS. 9 to 12 show some examples of the concept of a cell in 5G NR. FIG. 9 shows an exemplary deployment with single TRP cell. FIG. 10 shows an exemplary deployment with multiple TRP cells. FIG. 11 shows an exemplary 5G cell comprising a 5G node with multiple TRPs. FIG. 12 shows an exemplary comparison between a LTE cell and a NR cell.

There are some agreements on beam management in RAN1 #85 meeting, as described in the Final Report of 3GPP TSG RAN WG1 #85 v1.0.0 (Nanjing, China, 23-27 May 2016) as follows:
R1-165559 WF on Supported NR Operations Samsung, Nokia, Alcatel Lucent Shanghai Bell
Agreements:
Following three implementations of beamforming are to be studied in NR
Analog beamforming
Digital beamforming
Hybrid beamforming
Note: The physical layer procedure design for NR can be agnostic to UE/TRP with respect to the beamforming implementations employed at TRP/UE, but it may pursue beamforming implementation specific optimization not to lose efficiency
RAN1 studies both multi-beam based approaches and single-beam based approaches for these channels/signals/measurement/feedback
Initial-access signals (synchronization signals and random access channels)
System-information delivery
RRM measurement/feedback
L1 control channel
Others are FFS
Note: The physical layer procedure design for NR can be unified as much as possible whether multi-beam or single-beam based approaches are employed at TRP at least for synchronization signal detection in stand-alone initial access procedure
Note: single beam approach can be a special case of multi beam approach
Note: Individual optimization of single beam approach and multiple beam approach is possible
Multi-beam based approaches
In Multi-beam based approaches, multiple beams are used for covering a DL coverage area and/or UL coverage distance of a TRP/a UE
One example of multi-beam based approaches is beam sweeping:
When beam sweeping is applied for a signal (or a channel), the signal (the channel) is transmitted/received on multiple beams, which are on multiple time instances in finite time duration
Single/multiple beam can be transmitted/received in a single time instance
Others are FFS
Single-beam based approaches
In single-beam based approaches, the single beam can be used for covering a DL coverage area and/or UL coverage distance of a TRP/a UE, similarly as for LTE cell-specific channels/RS
For both single-beam and multi-beam based approaches, RAN1 can consider followings in addition
Power boosting
SFN
Repetition
Beam diversity (only for multi-beam approach)
Antenna diversity
Other approaches are not precluded
Combinations of single-beam based and multi-beam based approaches are not precluded
R1-165564 WF on UE Beamforming and Beam Management Nokia, Samsung, Intel, Interdigital, Alcatel-Lucent Shanghai Bell
Agreements:
RAN1 to study the beamforming procedures and their system impacts at least for multi beam based approach
Physical layer procedures for beamforming optimizing different metrics such as overheads and latencies in multi beam and single beam based approaches
Physical layer procedures in multi beam based approach that require beam training, i.e. steering of transmitter and/or receiver beams
E.g. Periodic/Aperiodic downlink/uplink TX/RX beam sweeping signals, where periodic signals may be semi-statically or dynamically configured (FFS)
E.g. UL sounding signals
Other example is not precluded
R1-165684 WF on Beamforming Procedures Nokia
Agreements:
Both intra-TRP and inter-TRP beamforming procedures are considered.
Beamforming procedures are considered with/without TRP beamforming/beam sweeping and with/without UE beamforming/beam sweeping, according to the following potential use cases:

UE movement, UE rotation, beam blocking:
  Change of beam at TRP, same beam at UE
  Same beam at TRP, change of beam at UE
  Change of beam at TRP, change of beam at UE
Other cases are not precluded There are some agreements on beam management in RAN1 #86 meeting, as described in the Final Report of 3GPP TSG RAN WG1 #86 v1.0.0 (Gothenburg, Sweden, 22-26 Aug. 2016) as follows:

R1-168278 WF on DL Beam Management Intel Corporation, Huawei, HiSilicon, Ericsson, Nokia, Alcatel-Lucent Shanghai Bell, Verizon, MTK, LGE, NTT DoCoMo, Xinwei
Agreements:
  The following DL L1/L2 beam management procedures are supported within one or multiple TRPs:
  P-1: is used to enable UE measurement on different TRP Tx beams to support selection of TRP Tx beams/UE Rx beam(s)
    For beamforming at TRP, it typically includes a intra/inter-TRP Tx beam sweep from a set of different beams
    For beamforming at UE, it typically includes a UE Rx beam sweep from a set of different beams
    FFS: TRP Tx beam and UE Rx beam can be determined jointly or sequentially
  P-2: is used to enable UE measurement on different TRP Tx beams to possibly change inter/intra-TRP Tx beam(s)
    From a possibly smaller set of beams for beam refinement than in P-1
    Note: P-2 can be a special case of P-1
  P-3: is used to enable UE measurement on the same TRP Tx beam to change UE Rx beam in the case UE uses beamforming
  Strive for the same procedure design for Intra-TRP and inter-TRP beam management
    Note: UE may not know whether it is intra-TRP or inter TRP beam
  Note: Procedures P-2&P-3 can be performed jointly and/or multiple times to achieve e.g. TRP Tx/UE Rx beam change simultaneously
  Note: Procedures P-3 may or may not have physical layer procedure spec. impact
  Support managing multiple Tx/Rx beam pairs for a UE
  Note: Assistance information from another carrier can be studied in beam management procedures
  Note that above procedure can be applied to any frequency band
  Note that above procedure can be used in single/multiple beam(s) per TRP
  Note: multi/single beam based initial access and mobility treated within a separate RAN1 agenda item R1-168468 Definitions Supporting Beam Related Procedures Nokia, Qualcomm, CATT, Intel, NTT DoCoMo, Mediatek, Ericsson, ASB, Samsung, LGE
{
  Beam management=a set of L1/L2 procedures to acquire and maintain a set of TRP(s) and/or UE beams that can be used for DL and UL transmission/reception, which include at least following aspects:
    Beam determination=for TRP(s) or UE to select of its own Tx/Rx beam(s).
    Beam measurement=for TRP(s) or UE to measure characteristics of received beamformed signals
    Beam reporting=for UE to report information a property/quality of of beamformed signal(s) based on beam measurement
    Beam sweeping=operation of covering a spatial area, with beams transmitted and/or received during a time interval in a predetermined way.
}

R1-168389 WF on the Design of Downlink Control Channel ZTE Corporation, ZTE Microelectronics, Qualcomm, ASTRI, Intel Corporation
Revision of R1-168274
Agreements:
  Study the relationship of beam(s) used for L1 control channel and beam(s) used for data channel
    E.g. Using different beamwidth for data and control
    E.g. Using different beam directions for data and control
    E.g. At least one beam is shared by data and control
    E.g., same beam for data and control There are some agreements on beam management in RAN1 #86bis meeting, as described in the Final Report of 3GPP TSG RAN WG1 #86bis v1.0.0 (Lisbon, Portugal, 10-14 Oct. 2016) as follows:

R1-1610971 WF on Definition of Beam Reciprocity Samsung, Qualcomm, InterDigital, Intel, IITM, IITH, CeWIT, Tejas Networks, KT, MediaTek, AT&T, Verizon, Motorola Mobility, Reliance Jio
Working Assumption:
  The followings are defined as Tx/Rx beam correspondence at TRP and UE:
    Tx/Rx beam correspondence at TRP holds if at least one of the following is satisfied:
      TRP is able to determine a TRP Rx beam for the uplink reception based on UE's downlink measurement on TRP's one or more Tx beams.
      TRP is able to determine a TRP Tx beam for the downlink transmission based on TRP's uplink measurement on TRP's one or more Rx beams
    Tx/Rx beam correspondence at UE holds if at least one of the following is satisfied:
      UE is able to determine a UE Tx beam for the uplink transmission based on UE's downlink measurement on UE's one or more Rx beams.
      UE is able to determine a UE Rx beam for the downlink reception based on TRP's indication based on uplink measurement on UE's one or more Tx beams.
    More refined definition can still be discussed R1-1610894 UL Beam Management Samsung, Huawei, Intel
Agreements:
  UL beam management is to be further studied in NR
  Similar procedures can be defined as DL beam management with details FFS, e.g.:
    U-1: is used to enable TRP measurement on different UE Tx beams to support selection of UE Tx beams/TRP Rx beam(s)
      Note: this is not necessarily useful in all cases
    U-2: is used to enable TRP measurement on different TRP Rx beams to possibly change/select inter/intra-TRP Rx beam(s)
    U-3: is used to enable TRP measurement on the same TRP Rx beam to change UE Tx beam in the case UE uses beamforming
  FFS Indication of information related to Tx/Rx beam correspondence is supported
  Study UL beam management based on:
    PRACH
    SRS
    DM-RS
    Other channels and reference signals are not precluded
  Study uplink beam management procedure by considering the Tx/Rx beam correspondence For the case of TRP and UE have Tx/Rx beam correspondence For the case of TRP has no Tx/Rx beam correspondence and/or UE has no Tx/Rx beam correspondence R1-1610964 WF on Beam Recovery Samsung, Qualcomm, Intel, KT, LGE, Ericsson Agreements:

NR supports mechanism(s) in the case of link failure and/or blockage for NR

Whether to use new procedure is FFS

Study at least the following aspects:

Whether or not an DL or UL signal transmission for this mechanism is needed

E.g., RACH preamble sequence, DL/UL reference signal, control channel, etc.

If needed, resource allocation for this mechanisms

E.g., RACH resource corresponding mechanism, etc.

There are some agreements on beam management in RAN1 #87 meeting, as described in the Final Report of 3GPP TSG RAN WG1 #87 v1.0.0 (Reno, USA, 14-18 Nov. 2016) as follows:

R1-1613287 WF on NR NW Initiated Beam Switching Intel, Ericsson

Agreements:

NR to provide robustness against beam pair link blocking

Study mechanisms to achieve the above purpose

E.g., by enabling PDCCH/PDSCH monitoring with N beams

E.g., N=1, 2, . . .

E.g., TDM monitoring, simultaneous monitoring, etc.

E.g., by enabling composite beams via e.g., SFBC and/or multi-stage control channel The examples are not intended to be exhaustive R1-1613682 WF on Beam Correspondence Samsung, NTT DOCOMO, InterDigital, MediaTek, Convida Wireless, Sharp Agreements:

Companies are encouraged to refine the definition of beam correspondence, if necessary Note: whether or not to introduce this definition in NR is a separate topic Under the refined definition of beam correspondence (if any), study whether or not mechanism(s) for determining UE's beam correspondence is needed.

the study may consider the following aspects— e.g. metrics to be considered SNR/Power (beam-quality), CSI, and others e.g. values of the metrics at which beam correspondence is declared e.g., complexity/overhead e.g., possibility of supporting reporting to the gNB about beam correspondence at the UE R1-1613670 WF on Beam Management for Control and Data Channel ZTE, ZTE Microelectronics, ASTRI, Intel, Samsung, LGE Agreements:

NR supports with and without a downlink indication to derive QCL assumption for assisting UE-side beamforming for downlink control channel reception FFS: details E.g., QCL assumption details E.g., indication signaling (e.g. DCI, MAC CE, RRC, etc.)

E.g., beam-related indication for DL control and data channels

R1-1613774 WF on UE Initiated UL Transmission in NR LG Electronics, Ericsson, Huawei, HiSilicon Agreements:

NR should study the necessity of event-driven UE initiated UL transmission, e.g., in the event of beam quality degradation E.g. due to UE mobility/rotation, blockage, and/or link failure, etc.

FFS: details of event(s) of beam quality degradation

There are some agreements on beam management in RAN1 #AH1_NR meeting, as described in the Final Report of 3GPP TSG RAN WG1 #AH1_NR v1.0.0 (Spokane, USA, 16-20 Jan. 2017) as follows:

R1-1701481 WF on Beam Recovery in Multi-Beam NR Systems Qualcomm, Nokia, ASB, Xinwei, Intel, Interdigital Agreements:

NR supports that UE can trigger mechanism to recover from beam failure

Network explicitly configures to UE with resources for UL transmission of signals for recovery purpose Support configurations of resources where the base station is listening from all or partial directions, e.g., random access region FFS: Triggering condition of recovery signal (FFS new or existing signals) associated UE behavior of monitoring RS/control channel/data channel Support transmission of DL signal for allowing the UE to monitor the beams for identifying new potential beams FFS: Transmission of a beam swept control channel is not precluded This mechanism(s) should consider tradeoff between performance and DL signaling overhead Agreements (Further to Offline):

NR-PDCCH transmission supports robustness against beam pair link blocking

UE can be configured to monitor NR-PDCCH on M beam pair links simultaneously, where $M \geq 1$. Maximum value of M may depend at least on UE capability.

FFS: UE may choose at least one beam out of M for NR-PDCCH reception

UE can be configured to monitor NR-PDCCH on different beam pair link(s) in different NR-PDCCH OFDM symbols FFS: NR-PDCCH on one beam pair link is monitored with shorter duty cycle than other beam pair link(s).

FFS: time granularity of configuration, e.g. slot level configuration, symbol level configuration FFS: Note that this configuration applies to scenario where UE may not have multiple RF chains FFS: The definition of monitoring NR-PDCCH on beam pair link(s).

Parameters related to UE Rx beam setting for monitoring NR-PDCCH on multiple beam pair links are configured by higher layer signaling or MAC CE and/or considered in the search space design FFS: Required parameters FFS: Need to support both higher layer signaling and MAC CE R1-1701351 WF on Beam Correspondence NTT DOCOMO, Samsung, Mitsubishi Electric, MediaTek, Sharp, OPPO, MTI Agreement:
  For the definition of beam correspondence:
    Confirm the previous working assumption of the definition
      Note: this definition/terminology is for convenience of discussion
    The detailed performance conditions are up to RAN4

Agreement:
  Support capability indication of UE beam correspondence related information to TRP
    FFS details including capability definition, case(s) (if any) when the indication is not necessary There are some agreements on beam management in RAN1 #88 meeting, as described in the Final Report of 3GPP TSG RAN WG1 #88 v1.0.0 (Athens, Greece, 13-17 Feb. 2017) as follows:

R1-1703558 RS for Beam Management Samsung, MediaTek, KT Corp., Nokia, ASB, Verizon Agreement: For the signal(s) utilized for beam management (BM) for P1/P2/P3, study further whether it is UE-specific vs. non-UE-specific R1-1703988 WF on Mechanism to Recover from Beam Failure Huawei, HiSilicon, LG Electronics, MediaTek, AT&T, Samsung, vivo Agreements:
  Beam failure event occurs when the quality of beam pair link(s) of an associated control channel falls low enough (e.g. comparison with a threshold, time-out of an associated timer). Mechanism to recover from beam failure is triggered when beam failure occurs
    Note: here the beam pair link is used for convenience, and may or may not be used in specification
    FFS: whether quality can additionally include quality of beam pair link(s) associated with NR-PDSCH
    FFS: when multiple Y beam pair links are configured, X (<=Y) out of Y beam pair links falls below certain threshold fulfilling beam failure condition may declare beam failure
    FFS: search space (UE-specific vs. common) of the associated NR-PDCCH
    FFS: signaling mechanisms for NR-PDCCH in the case of UE is configured to monitor multiple beam pair links for NR-PDCCH
    Exact definition of such threshold is FFS and other conditions for triggering such mechanism are not precluded
  The following signals can be configured for detecting beam failure by UE and for identifying new potential beams by UE
    FFS the signals, e.g., RS for beam management, RS for fine timing/frequency tracking, SS blocks, DM-RS of PDCCH (including group common PDCCH and/or UE specific PDCCH), DMRS for PDSCH
  If beam failure event occurs and there are no new potential beams to the serving cell, FFS whether or not the UE provides an indication to L3.
    Note: the criterion for declaring radio link failure is for RAN2 to decide.
    FFS: The necessity of such indication
  NR supports configuring resources for sending request for recovery purposes in symbols containing RACH and/or FFS scheduling request or in other indicated symbols R1-1703571 WF on UL Signal for Link Failure Recovery Request LG Electronics, Huawei, HiSilicon, MediaTek, Samsung, Nokia Agreements:
  The following mechanisms should be supported in NR:
    The UL transmission to report beam failure can be located in the same time instance as PRACH:
      Resources orthogonal to PRACH resources
        FFS orthogonal in frequency and/or sequences (not intended to impact PRACH design)
        FFS channels/signals
    The UL transmission to report beam failure can be located at a time instance (configurable for a UE) different from PRACH
      Consider the impact of RACH periodicity in configuring the UL signal to report beam failure located in slots outside PRACH
      FFS the signal/channel for the UL transmission
    Additional mechanisms using other channels/signals are not precluded (e.g., SR, UL grant free PUSCH, UL control)

There are some agreements on beam management in RAN1 #88bis meeting, as described in the Final Report of 3GPP TSG RAN WG1 #88bis v1.0.0 (Spokane, USA, 3-7 Apr. 2017) as follows:

R1-1706633 WF on Beam Failure Recovery MediaTek, Ericsson, Samsung, KT Corp, InterDigital Agreements:
  UE Beam failure recovery mechanism includes the following aspects
    Beam failure detection
    New candidate beam identification
    Beam failure recovery request transmission
    UE monitors gNB response for beam failure recovery request
  Beam failure detection
    UE monitors beam failure detection RS to assess if a beam failure trigger condition has been met
    Beam failure detection RS at least includes periodic CSI-RS for beam management
      SS-block within the serving cell can be considered, if SS-block is also used in beam management as well
    FFS: Trigger condition for declaring beam failure
  New candidate beam identification
    UE monitors beam identification RS to find a new candidate beam
    Beam identification RS includes
      Periodic CSI-RS for beam management, if it is configured by NW
      Periodic CSI-RS and SS-blocks within the serving cell, if SS-block is also used in beam management as well
  Beam failure recovery request transmission
    Information carried by beam failure recovery request includes at least one followings
      Explicit/implicit information about identifying UE and new gNB TX beam information
      Explicit/implicit information about identifying UE and whether or not new candidate beam exists
      FFS:
        Information indicating UE beam failure
        Additional information, e.g., new beam quality
    Down-selection between the following options for beam failure recovery request transmission
      PRACH
      PUCCH
      PRACH-like (e.g., different parameter for preamble sequence from PRACH)

Beam failure recovery request resource/signal may be additionally used for scheduling request UE monitors a control channel search space to receive gNB response for beam failure recovery request FFS: the control channel search space can be same or different from the current control channel search space associated with serving BPLs FFS: UE further reaction if gNB does not receive beam failure recovery request transmission Conclusion:

Note: Necessity of SS block and DMRS will be discussed simultaneously later

R1-1706453 WF on Beam Recovery Mechanisms LG Electronics, Ericsson, Intel, KT Corp., Nokia, MediaTek Agreements:

Study how to support at least one mechanism when NW receive the beam failure recovery request E.g., NW assigns UL grant for beam reporting, NW transmits DL RS for beam measurement, NW signal beam indication or confirmation to UE, etc.

E.g., UE assistance on NW decision of which mechanism to apply

Whether or not a specific mechanism has specification impact

R1-1706681 WF on Recovery from Beam Failure Samsung, MediaTek, Ericsson, NTT DOCOMO Agreement: FFS for the situation of "no new candidate beam", whether or not there are issues, and if so, whether or not RLF procedure can sufficiently handle the issues There are some agreements on beam management in RAN1 #89 meeting, as described in the Final Report of 3GPP TSG RAN WG1 #89 v1.0.0 (Hangzhou, China, 15-19 May 2017) as follows:

R1-1709606 Summary from Offline for Beam Recovery Mechanism MediaTek

Working Assumption:

Support at least the following triggering condition(s) for beam failure recovery request transmission:

Condition 1: when beam failure is detected and candidate beam is identified at least for the case when only CSI-RS is used for new candidate beam identification FFS Condition 2: Beam failure is detected alone at least for the case of no reciprocity FFS how the recovery request is transmitted without knowledge of candidate beam Note: if both conditions are supported, which triggering condition to use by UE also depends on both gNB configuration and UE capability R1-1709309 WF on Beam Recovery ZTE, MediaTek, vivo, Spreadtrum, Qualcomm, ASTRI, AT&T, OPPO, Ericsson, LGE, Xinwei Conclusion:

FS SS-block in addition to CSI-RS is at least supported for P-1 in beam management FFS with or without L1-RSRP reporting Agreements:

Support the following channel(s) for beam failure recovery request transmission:

Non-contention based channel based on PRACH, which uses a resource orthogonal to resources of other PRACH transmissions, at least for the FDM case FFS other ways of achieving orthogonality, e.g., CDM/TDM with other PRACH resources FFS whether or not have different sequence and/or format than those of PRACH for other purposes Note: this does not prevent PRACH design optimization attempt for beam failure recovery request transmission from other agenda item FFS: Retransmission behavior on this PRACH resource is similar to regular RACH procedure Support using PUCCH for beam failure recovery request transmission FFS whether PUCCH is with beam sweeping or not Note: this may or may not impact PUCCH design FFS Contention-based PRACH resources as supplement to contention-free beam failure recovery resources From traditional RACH resource pool 4-step RACH procedure is used Note: contention-based PRACH resources is used e.g., if a new candidate beam does not have resources for contention-free PRACH-like transmission FFS whether a UE is semi-statically configured to use one of them or both, if both, whether or not support dynamic selection of one of the channel(s) by a UE if the UE is configured with both R1-1709639 WF on Handling Beam Failure Recovery for Unexpected Cases Vivo, Qualcomm, KT Corp, Ericsson Agreements:

To receive gNB response for beam failure recovery request, a UE monitors NR PDCCH with the assumption that the corresponding PDCCH DM-RS is spatial QCL'ed with RS of the UE-identified candidate beam(s)

FFS whether the candidate beam(s) is identified from a preconfigured set or not

Detection of a gNB's response for beam failure recovery request during a time window is supported FFS the time window is configured or pre-determined FFS the number of monitoring occasions within the time window FFS the size/location of the time window If there is no response detected within the window, the UE may perform re-tx of the request FFS details If not detected after a certain number of transmission(s), UE notifies higher layer entities FFS the number of transmission(s) or possibly further in combination with or solely determined by a timer There are some agreements on beam management in RAN1 #AH1_NR2 meeting, as described in the Final Report of 3GPP TSG RAN WG1 #AH1_NR2 v1.0.0 (Qingdao, China, 27-30 Jun. 2017) as follows:

Agreements:

RAN1 agrees that the certain number of beam failure recovery request transmissions is NW configurable by using some parameters Parameters used by the NW could be:

Number of transmissions

Solely based on timer

Combination of above

FFS: whether beam failure recovery procedure is influenced by the RLF event

Agreements:

In case of unsuccessful recovery from beam failure, UE sends an indication to higher layers, and refrains from further beam failure recovery Relationship between RLF and unsuccessful beam failure recovery indication (if any) e.g. whether beam failure recovery procedure influences or is influenced by the RLF event Send LS to inform RAN2—to be done next meeting R1-1711717 WF on Using SS Block for Beam Recovery ZTE, Ericsson, NTT DOCOMO, MediaTek, Spreadtrum, Vivo, OPPO, Qualcomm, Xinwei, LG Electronics, AT&T, Lenovo, CMCC, China Unicom, China Telecom, ASTRI, Samsung, Nokia, ASB, III, MTI, Sharp, National Instruments Proposals:

In addition to periodic CSI-RS, SS-block within the serving cell can be used for new candidate beam identification Supported by: ZTE, Ericsson, NTT DOCOMO, MediaTek, Spreadtrum, vivo, OPPO, Qualcomm, Xinwei, LG Electronics, AT&T, Lenovo, CMCC, China Unicom, China Telecom, ASTRI, Samsung, Nokia, ASB, III, MTI, Sharp, National Instruments Objected by: IDC, HW, HiSi, Intel Continue Discussion Next Meeting There are some agreements on beam management in RAN1 #90 meeting, as described in the Final Chairman's Note of 3GPP TSG RAN WG1 Meeting #90 (Prague, Czech Republic, 21-25 Aug. 2017) as follows:

R1-1715012 Offline Discussion on Beam Recovery Mechanism MediaTek Inc

Agreements:

Beam failure is declared only when all serving control channels fail.

When a subset of serving control channels fail, this event should also be handled Details FFS R1-1714771 Offline Discussion Summary on Beam Recovery Mechanism MTK Agreements:

In addition to periodic CSI-RS, SS-block within the serving cell can be used for new candidate beam identification The following options can be configured for new candidate beam identification CSI-RS only Note: in this case, SSB will not be configured for new candidate beam identification SS block only Note: in this case, CSI-RS will not be configured for new candidate beam identification FFS: CSI-RS+SS block Working Assumption:

For beam failure recovery request transmission on PRACH, support using the resource that is CDM with other PRACH resources.

Note that CDM means the same sequence design with PRACH preambles.

Note that the preambles for PRACH for beam failure recover request transmission are chosen from those for content-free PRACH operation in Rel-15

Note: this feature is not intended to have any impact on design related to other PRACH resources Further consider whether TDM with other PRACH is needed There are some agreements on beam management in RAN1 #AH_NR3 meeting, as described in the Final Chairman's Note of 3GPP TSG RAN WG1 Meeting #AH_NR3 (Nagoya, Japan, 18-21 Sep. 2017) as follows:

R1-1716874 Offline Summary on Beam Recovery Mechanism MediaTek

Agreement:

WA on trigger condition 1 for beam recovery request transmission is confirmed with following revision "Support at least the following triggering condition(s) for beam failure recovery request transmission:

Condition 1: when beam failure is detected and candidate beam is identified"

Agreement:

The following working assumption is confirmed

For beam failure recovery request transmission on PRACH, support using the resource that is CDM with other PRACH resources Note that CDM means the same sequence design with PRACH preambles.

Note that the preambles for PRACH for beam failure recover request transmission are chosen from those for contention-free PRACH operation in Rel-15

Note: this feature is not intended to have any impact on design related to other PRACH resources Further consider whether TDM with other PRACH is needed Note: Companies may further study the necessity and feasibility of additional cyclic shifts on the preamble sequences for transmission of beam failure recovery requests R1-1716920 Way Forward on Dedicated PRACH Allocation for Beam Failure Recovery Mechanism MediaTek, InterDigital, Huawei, Hisilicon, LG, Intel, Ericsson Agreement:

For new candidate beam identification purpose

In CSI-RS only case, a direct association is configured between only CSI-RS resources and dedicated PRACH resources In SS block only case, a direct association is configured between only SS block resources and dedicated PRACH resources In CSI-RS+SS block case (if supported), an association is configured between resources of CSI-RS/SSB and dedicated PRACH resources CSI-RS and SSB can be associated with the same dedicated resource through QCL association There are some agreements on beam management in RAN1 #90bis meeting, as described in the Final Chairman's Note of 3GPP TSG RAN WG1 Meeting #90bis (Prague, Czech Republic, 9-13 Oct. 2017) as follows:

R1-1719170 WF on Beam Management Parameters Qualcomm, Ericsson, Intel, LGE, Samsung, Huawei, HiSilicon, Nokia, NSB Emails discussion to finalize the parameter list for BM
  Until October 27—Sundar (Qualcomm)

Update After Email Approval:

Agreements:

Include the RRC parameter: Num-Reported-RS-Measure. Value Range—{1,2,3,4}, Default—1.

The number N of measured RS resources to be reported per report setting in a non-group-based report. N<=N_max, where N_max is either 2 or 4 depending on UE capability. The value range for N is {1,2,3,4}.

Note: this parameter may not be needed for certain RS and/or report settings

FFS: The signaling mechanism for the gNB to select a subset of N beams for the UE to measure and report.

FFS the inclusion of the parameter Apply_Same_Spatial-Filter_Mult-SRS-Resource.

Beam management to not discuss the RRC parameter on power control for SRS and merge it with the power control discussion in UL PC.

Support parameter Is-TCI-Present

Whether for the case when at least spatial QCL is configured/indicated, if TCI field is present or not present in DL-related DCI. FFS: Details on whether it is per-CORESET or per-UE configured Boolean Default is True For the case when TCI is not present in DL-related DCI, continue discussion of the details regarding higher-layer signaling of QCL parameters/indication for determining QCL parameters for PDSCH NR supports a mechanism to identify the spatial QCL if the offset between the time of reception of DL assignment for the PDSCH and time of reception of PDSCH is less than Threshold-Sched-Offset.

FFS: if the identification requires explicit RRC signaling or rule based.

NR does not support the RRC parameter in beam management: Threshold-Sched-Offset.

FFS if such a parameter is included as a UE capability

Support the following parameter:

SRS-SpatialRelationInfo Configuration/indication of the spatial relation between a reference RS and the target SRS. Reference RS can be SSB/CSI-RS/SRS. Source: R1-1718920

Value range: {SSB, CSI-RS, SRS}

Support the following RRC parameter:

resource-config-SS-list List of SSB resources used for beam measurement and reporting in a resource set. Source: R1-1719059

Value range: {SSB indices}

Support an RRC parameter to configure RS resources for the purpose of new candidate beam identification.

FFS whether the parameter is the type of reference signal or the actual resources used for beam failure recovery.

Confirm the following working assumption:

Beam failure detection is determined based on the following quality measure:

Hypothetical PDCCH BLER

FFS: if RRC parameter is required to set different threshold values for UE to detect beam failure.

Continue discussion on the threshold type, and whether or not the need for RRC parameter for Candidate-Beam-Identification-Threshold Support parameter "Beam-failure-recovery-request-RACH-Resource"

Parameters for dedicated PRACH resources for beam failure recovery:

Preamble sequence related parameters, e.g., root sequence, cyclic shift, and preamble index.

Maximum number of transmissions

Maximum number of power rampings

Target received power

Timer for retransmission

Retransmission Tx power ramping step size

Beam failure recovery timer

Note: could be a subset of above parameters if re-using the same parameter as initial access FFS details of the structure and elements No need to introduce RRC parameter Beam-Failure-Resource as it is covered by "Beam-failure-recovery-request-RACH-Resource"

FFS potential RRC parameter Beam-Failure-Recovery-Response-CORESET & Candidate-Beam-BFR-Resource-List R1-1718933 Offline Discussion Summary on Beam Failure Recovery MediaTek Agreement:

gNB response is transmitted via a PDCCH addressed to C-RNTI

FFS: DCI format for gNB response

Dedicated CORESET(s) is applied for monitoring gNB response for BFRQ. The CORESET is down-selected from the following two alternatives:

Alt 1: the same CORESET (s) as before beam failure

Alt 2: dedicatedly configured CORESET for beam failure recovery.

R1-1718982 Way Forward on Candidate Beam Identification for Beam Failure Recovery Huawei, HiSilicon, LGE, Intel, Interdigital AT&T, Vivo, Spreadtrum, Lenovo, Motorola Mobility Sharp, KT Corporation, OPPO, ZTE, SaneChips, Nokia, Nokia Shanghai Bell, China Telecom Also supported by Convida Wireless, WILUS Inc, Fujitsu Agreement:

Specification supports the CSI-RS+SS block case for the purpose of new candidate beam identification The above case is configured by gNB Note: a dedicated PRACH resource is configured to either an SSB or a CSI-RS resource Following two scenarios are supported when a UE is configured with CSI-RS+SSB Scenario 1: PRACHs are associated to SSBs only In this scenario, CSI-RS resources for new beam identification can be found from the QCL association to SSB(s).

Scenario 2: Each of the multiple PRACHs is associated to either an SSB or a CSI-RS resource FFS: multiple SSB can be associated with the same uplink resource.

CATT has concerns on the above agreement that it may not be an essential feature for beam failure recovery Working Assumption:

Beam failure detection is determined based on the following quality measure:

Hypothetical PDCCH BLER

R1-1719174 WF on Beam Failure Recovery MediaTek, Intel, Huawei, HiSilicon, ZTE, Sanechips, CHTTL Proposal:

A beam recovery request can be transmitted if the number of consecutive detected beam failure instance exceeds a configured maximum number (Working assumption) If hypothetical PDCCH BLER is above a threshold, it is counted as beam failure instance Note: Beam failure is determined when all serving beams fail The candidate beam can be identified when metric X of candidate beam is higher than a threshold FFS: metric X 1 or 2 threshold values are introduced If 2 thresholds are introduced, one is for SSB and the other is for CSI-RS One of the following alternatives will be down-selected in RAN1 #91

Alt-1: Fixed value

Alt-2: Configurable value by RRC signaling

RAN2 should specify the RRC signaling to configuration of the threshold

Note: for beam failure detection, the UE should aware the transmission power offset between CSI-RS and DMRS of PDCCH FFS other details.

Agreement:

For gNB to uniquely identify UE identity from a beam failure recovery request transmission A PRACH sequence is configured to UE Working Assumption:

At least the following parameters should be configured for dedicated PRACH resources for beam failure recovery Per UE parameters
- Preamble sequence related parameters
  - E.g., root sequence, cyclic shift, and preamble index
- Maximum number of transmissions
- Maximum number of power rampings
- Target received power
- Retransmission Tx power ramping step size
- Beam failure recovery timer Per dedicated PRACH resource parameters
- Frequency location information
- Time location, if it is only a subset of all RACH symbols (e.g., PRACH mask)
- Associated SSB or CSI-RS information Note: as a starting point, use initial access preamble transmission mechanism and parameters. If any issue is identified, new mechanism can be introduced.
- No further RRC signalling for above UE parameters is required if reusing the same parameter as initial access Email discussion to discuss the remaining beam failure recovery issues in slides 8, 9, 10 of R1-1719174
Until October 27, Chia-Hao (MediaTek)
Update from Email Approval:
Agreements:
Support RRC configuration of a time duration for a time window and a dedicated CORESET for a UE to monitor gNB response for beam failure recovery request.
- UE assumes that the dedicated CORESET is spatial QCL'ed with DL RS of the UE-identified candidate beam in the beam failure recovery request.
- FFS: multiple dedicated CORESETs can be configured to a UE, where each CORESET can have different spatial QCL configuration
- Note: the time window is determined by a fixed time offset defined in the spec with respect to beam failure recovery request transmission and the RRC configurable time duration starting from the fixed time offset. FFS the value of fixed time offset k (slots).

One or multiple of following terminologies may be used hereafter:
- BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
- TRP: A transmission and reception point provides network coverage and directly communicates with UEs. TRP could also be referred to as distributed unit (DU) or network node.
- Cell: A cell is composed of one or multiple associated TRPs, i.e. coverage of the cell is composed of coverage of all associated TRP(s). One cell is controlled by one BS. Cell could also be referred to as TRP group (TRPG).
- Beam sweeping: In order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.
- Beam sweeping number: A necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.
- Serving beam: A serving beam for a UE is a beam generated by a network node, e.g. TRP, which is currently used to communicate with the UE, e.g. for transmission and/or reception.
- Candidate beam: A candidate beam for a UE is a candidate of a serving beam. Serving beam may or may not be candidate beam.
- Qualified beam: A qualified beam is a beam with radio quality, based on measuring signal on the beam, better than a threshold.
- The best serving beam: The serving beam with the best quality (e.g. the highest BRSRP value).
- The worst serving beam: The serving beam with the worst quality (e.g. the worst BRSRP value).

Figure 18:
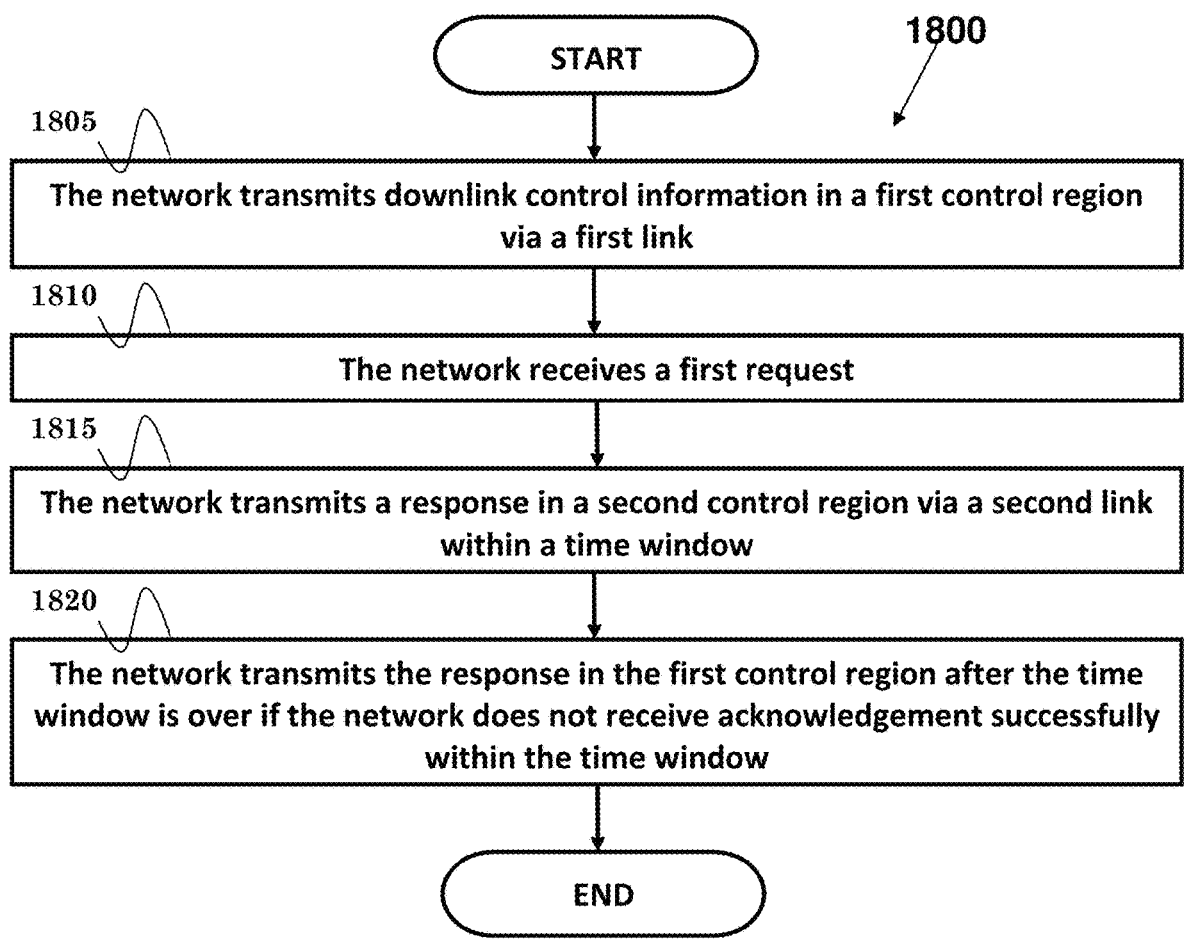
FIG. 18 is a flow chart according to one exemplary embodiment.

One or multiple of following assumptions for network side may be used hereafter:
- NR using beamforming could be standalone, i.e. UE can directly camp on or connect to NR.
- NR using beamforming and NR not using beamforming could coexist, e.g. in different cells.
- TRP would apply beamforming to both data and control signaling transmissions and receptions, if possible and beneficial.
  - Number of beams generated concurrently by TRP depends on TRP capability, e.g. maximum number of beams generated concurrently by different TRPs may be different.
  - Beam sweeping is necessary, e.g. for the control signaling to be provided in every direction.
  - (For hybrid beamforming) TRP may not support all beam combinations, e.g. some beams could not be generated concurrently. FIG. 18 shows an example for combination limitation of beam generation.
- Downlink timing of TRPs in the same cell are synchronized.
- RRC layer of network side is in BS.
- TRP should support both UEs with UE beamforming and UEs without UE beamforming, e.g. due to different UE capabilities or UE releases.

Figure 13:
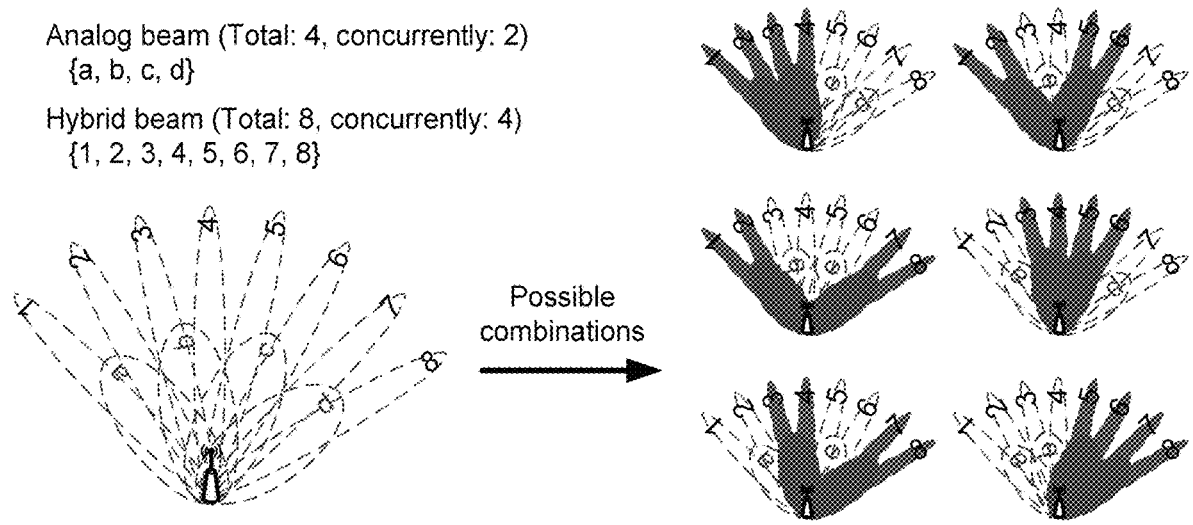
FIG. 13 shows an exemplary combination limitation of beam generation.

One or multiple of following assumptions for UE side may be used hereafter:
- UE may perform beamforming for reception and/or transmission, if possible and beneficial.
  - Number of beams generated concurrently by UE depends on UE capability, e.g. generating more than one beam is possible.
  - Beam(s) generated by UE is wider than beam(s) generated by TRP, gNB, or eNB.
  - Beam sweeping for transmission and/or reception is generally not necessary for user data but may be necessary for other signaling, e.g. to perform measurement.
  - (For hybrid beamforming) UE may not support all beam combinations, e.g. some beams could not be generated concurrently. FIG. 13 shows an example of combination limitation of beam generation.
- Not every UE supports UE beamforming, e.g. due to UE capability or UE beamforming is not supported in NR first (few) release(s).
- One UE is possible to generate multiple UE beams concurrently and to be served by multiple serving beams from one or multiple TRPs of the same cell.

Same or different (DL or UL) data could be transmitted on the same radio resource via different beams for diversity or throughput gain.

There are at least two UE (RRC) states: connected state (or called active state) and non-connected state (or called inactive state or idle state). Inactive state may be an additional state or belong to connected state or non-connected state.

Figure 14:
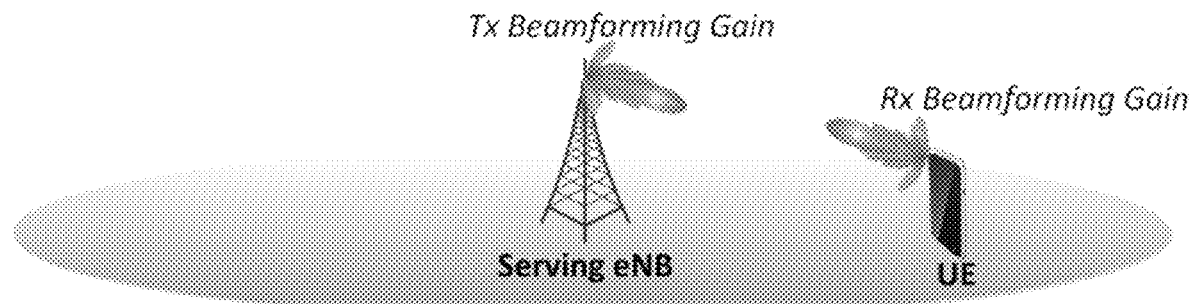
FIG. 14 is a reproduction of FIG. 3 of 3GPP R2-162251.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 14 (a reproduction of FIG. 3 of 3GPP R2-162251) illustrates gain compensation by beamforming.

Figure 15:
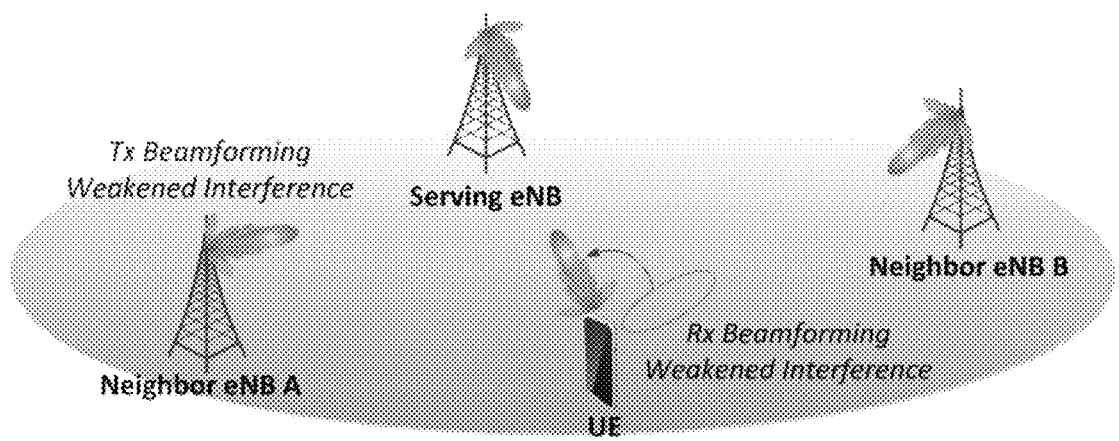
FIG. 15 is a reproduction of FIG. 4 of 3GPP R2-162251.

From the SINR perspective, sharp beamforming reduces interference power from neighbor interferers, i.e. neighbor eNBs in downlink case or other UEs connected to neighbor eNBs. In TX beamforming case, only interference from other TXs whose current beam points the same direction to the RX will be the "effective" interference. The "effective" interference means that the interference power is higher than the effective noise power. In RX beamforming case, only interference from other TXs whose beam direction is the same to the UE's current RX beam direction will be the effective interference. FIG. 15 (a reproduction of FIG. 4 of 3GPP R2-162251) illustrates a weakened interference by beamforming.

In 5G or NR, in order to provide a huge traffic rate for variable types of requirement and service in the future, wider and higher frequency bandwidths are used to achieve the goal. However, the higher bands in which the transmission is performed, the more severe the propagation loss is. Hence, in NR, beamforming technology has been considered and accepted as a method to alleviate the problem and improve the coverage.

In NR, there is one or multiple beam pair links between UE and network to connect. However, if the UE beam and network beam do not match due to rotation or blockage, the link between UE and network would fail. More specifically, when the quality of beam pair link(s) of an associated control channel falls low enough (e.g. comparison with a threshold, time-out of an associated timer), the (beam pair) link between UE and network is considered as fail, which is called beam failure. Mechanism to recover from beam failure is triggered when beam failure occurs. In NR, beam failure procedure includes the following steps:

Beam failure detection
New candidate beam identification
Beam failure recovery request (BFRQ) transmission
UE monitors gNB response for beam failure recovery request The details can be found in the Final Report of 3GPP TSG WG1 #88bis v1.0.0.

Currently, after beam failure is detected by a UE, the UE may transmit a beam failure recovery request (BFRQ) to network, which comprises information of an UE-identified candidate beam for recovery. After transmitting the request, the UE would start to monitor the gNB response to the request in a configured time window, wherein there is a time offset between the request (transmission time) and the starting time of the time window. Based on agreements in 3GPP RAN1, the network would configure a dedicated CORESET for the UE to monitoring gNB response within the time window. More specifically, the UE would monitor the gNB response in a configured CORESET dedicated for gNB response monitoring, where the dedicated CORESET may not be the same as (or the same as one subset of) the CORESET(s) that the UE monitored before beam failure occurs or being detected. The CORESET that UE monitored before beam failure is denoted as the previous CORESET throughout the invention.

However, one thing that is still undefined and not clear is the UE monitoring behavior after the time window, if the gNB response is not received during the time window. The reason why the gNB response is not received by UE may be that beam failure recovery request is not received by gNB. Another possible reason is that gNB response is missed on the UE side. After the time window is over, since the UE is still in RRC_CONNECTED mode, the UE may go back to monitoring the CORESET(s) (via the failed serving beams) that the UE monitored before beam failure. However, there is chance that the gNB has received the beam failure recovery request and transmit the gNB response to the UE, but somehow the gNB response is missed by the UE. In such a case, it may not be efficient if the UE keeps monitoring the previous CORESET via the failed serving beam considering the network has realized the serving beams have failed and the beam recovery request is transmitted. Such a behavior may block quick reconnection between UE and network until the next BFRQ transmission opportunity and the next time window. Hence, the exact behavior should be defined to avoid ambiguity in UE and/or network. In addition, the efficiency for quick reconnection between network and UE should also be taken into account. The invention provides some solutions to tackle out this issue, which are described in detail below.

In one embodiment, the UE monitors or receives a first control region. The UE could monitor and/or receive the first control region via a first link. The UE could also monitor and/or receive a second control region. More specifically, the UE could monitor and/or receive a second control region via a second link. Furthermore, the UE could receive control signaling and/or data transmission transmitted from network via the first link. In addition, the UE could receive and/or monitor downlink control information from network via the first link, wherein the downlink control information comprises at least one of downlink assignment, uplink grant, CSI reporting triggering, and SRS triggering. The UE could also receive control signaling and/or data transmission transmitted from network via the second link.

An exemplary first control region may be described with more detail as follows. In one embodiment, the first control region could be a CORESET or a search space. The first control region could include a set of PDCCH candidates or a set of frequency and time resources. The first control region could be a CORESET configured for monitoring downlink control signaling. More specifically, the first control region could be a CORESET configured for monitoring downlink control signaling which may indicate DL assignment(s) and/or UL grant(s).

An exemplary second control region may be described with more details as follows. In one embodiment, the second control region could be a CORESET or a search space. The second control region could include a set of PDCCH candidates or a set of frequency and time resources. In one embodiment, the UE could monitor and/or receive at least (downlink) control information in the second control region. In particular, the second control region could be a CORESET configured for monitoring gNB response after transmitting a beam failure recovery request.

An exemplary first link can be described with more detail as follows. In one embodiment, the first link could be configured to the UE by higher layer. Furthermore, the first link could be a radio link. The first link could also be at least one (DL) beam. More specifically, the first link is at least one (DL) beam pair link. In one embodiment, the first link could be at least one (DL) beam pair link in single carrier. In particular, the first link could mean at least one beam pair link which is served for the UE. Alternatively, the first link means all beam pair links which are served for the UE.

An exemplary second link can be described with more detail as follows. In one embodiment, the second link could be identified by the UE. In particular, the UE could identify the second link and could transmit and/or report information about the second link to the network. The second link could be a radio link. In one embodiment, the second link could be at least one (DL) beam. More specifically, the second link could be at least one (DL) beam pair link. In particular, the second link could be at least one (DL) beam pair link in single carrier.

After the UE detects the first link is failed, the UE could transmit a first request to network. In one embodiment, "the first link is failed" could mean "beam failure occurs". In particular, "the first link is failed" could means that all (serving) beam pair links of the UE fail or that all control channels of all (serving) beam pair links of the UE fail. In one embodiment, when the quality of beam pair link(s) of an associated control channel falls low enough (e.g. comparison with a threshold, time-out of an associated timer), the beam pair link between UE and network would be considered as fail.

In one embodiment, the UE could detect the first link is failed based on a metric. More specifically, the UE detects the first link is failed if the measured quality of the first link by the metric is below a threshold. The metric could be related to SINR, hypothetical BLER, or RSRP.

In one embodiment, the first request could be a beam failure recovery request. The first request may at least comprise and/or indicate an ID or index of a downlink reference signal and/or an RSRP value. The downlink reference signal could be associated with a candidate beam. Furthermore, the network could transmit the downlink reference signal on the candidate beam. The UE could detect and/or find the candidate beam based on the measurement of the downlink reference signal. The downlink reference signal could be spatially QCL'ed to the candidate beam.

Alternatively, the first request may comprise and/or indicate beam index of the candidate beam. The UE could expect the network to use the candidate beam to transmit a response or downlink transmission to the UE after the first link is failed. Furthermore, the UE could use the same spatial filter to transmit the first request as that to receive the downlink reference signal. The UE could also use the same spatial filter to receive the response as that to receive the downlink reference signal. More specifically, the UE could use the same spatial filter to receive the response as that to transmit the first request. More specifically, the UE could use the same spatial filter to receive the candidate beam as that to receive the downlink reference signal. In one embodiment, the candidate beam could be the second link. The second link could also comprise and/or include the candidate beam.

In one embodiment, after transmitting the first request, the UE could monitor and/or receive a response from the network. In particular, the UE could monitor and/or receive the response on the second control region after transmitting the first request. In one embodiment, the UE could monitor and/or receive the response on the second control region during a time window associated with the first request transmission. The starting time of the time window could be associated with the first request. In one embodiment, there is a time offset between the transmission time (unit) of the first request and the starting time (unit) of the time window. The transmission time unit of the first request can be slot, subframe, symbol, subslot, mini-slot, TTI, or shortened TTI. The starting time unit of the time window can also be slot, subframe, symbol, subslot, mini-slot, TTI, or shortened TTI. In one embodiment, the response could be a beam failure recovery response. More specifically, the response is a gNB response. The second control region or the second configuration associated with the second control region could be dedicated and configured to the UE for monitoring the response.

In one embodiment, the UE could monitor and/or receive the response via the second link. In particular, the UE could monitor and/or receive the response via the candidate beam indicated in the first request. More specifically, the UE could monitor and/or receive the response on the second control region on the second link during the time window. After the UE receives the response, the UE may transmit an acknowledgement to the network.

In one embodiment, the response can be defined with more detail as follows. The response could be UE-specific. The response could also be scrambled by or addressed to an identity in a cell. In one embodiment, the identity could be C-RNTI. Alternatively, the response could be a DCI. More specifically, the response could be a DCI scrambled by or addressed to C-RNTI. After the time window is over, the UE could stop monitoring the response.

Alternatively, the response could be a downlink assignment, an UL grant, or an aperiodic CSI report triggering. The response could also be a DL/UL RS transmission or DL/UL RS transmission triggering. In one embodiment, the response could be for beam refinement. In particular, the response could trigger a beam reporting.

In one embodiment, the acknowledgement can be defined with more detail as follows. The acknowledgement could be an uplink control signal (e.g. ACK/NACK), an uplink transmission (e.g. PUSCH, PUCCH and PRACH), a CSI reporting, or a beam report.

If the UE does not receive the response within the time window associated with the first request, the UE could trigger a second request transmission. More specifically, if the UE does not receive the response within the time window associated with the first request, the UE could transmit a second request. There may be a time gap between the last time (unit) of the time window associated with the first request and the transmission time (unit) of the second request. In one embodiment, a time gap could mean the time duration between the last time (unit) of the time window associated with the first request and the transmission time (unit) of the second request.

Alternatively, there may be a time gap between the last time (unit) of the time window associated with the first request and the starting time (unit) of the time window associated with the second request. In one embodiment, a time gap could mean the time duration between the last time (unit) of the time window associated with the first request and the transmission time (unit) of the second request and also the time offset between the transmission time (unit) of the second request and starting time (unit) of a time window associated with the second request. In another embodiment, a time gap could mean the time duration between the last time (unit) of the time window associated with the first request and starting time (unit) of a time window associated with the second request. In one embodiment, the last time unit of the time window can be slot, subframe, symbol, subslot, mini-slot, TTI, or shortened TTI. The transmission time unit of the second request can also be slot, subframe, symbol, subslot, mini-slot, TTI, or shortened TTI. To be more specific, the second request could mean the next available transmission (opportunity) for beam failure recovery request after the first request. More specifically, the second request could mean the next available transmission (opportunity) for beam failure recovery request after the time window associated with the first request.

In one embodiment, the UE's monitoring behavior during the time gap can be implemented in the following alternatives. The following alternative(s) can be (but are not limited to) performed during the time gap.

Alternative 1:

In one embodiment, after the time window is over, the network could transmit the response in the first control region. However, after the time window is over, the network may not transmit the response in the second control region. More specifically, after the time window is over, the network could transmit the response in the first control region until the time gap is over. However, after the time window is over, the network may not transmit the response in the second control region until the time gap is over.

In one embodiment, after the time window is over, the network could transmit the response in the first control region until reception of the second request. However, after the time window is over, the network may not transmit the response in the second control region until the time gap is over. More specifically, after the time window is over, the network could transmit the response in the first control region until a time offset after reception of the second request. However, after the time window is over, the network may not transmit the response in the second control region until a time offset after reception of the second request.

In one embodiment, after the time window is over, the network could transmit the response in the first control region until starting time of a time window associated with the second request. However, after the time window is over, the network may not transmit the response in the second control region until starting time of a time window associated with the received second request. More specifically, the network could transmit the response in the first control region via the second link and/or via the candidate beam. Alternatively, the network could transmit the response in the first control region via the first link.

In one embodiment, the network transmits the response in the first control region could mean the network transmits at least downlink control information or downlink transmission in the same time domain resources and/or in the same frequency domain resources as that of the first control region.

In one embodiment, after the time window is over, the UE could monitor the first control region. However, after the time window is over, the UE does not monitor the second control region. More specifically, after the time window is over, the UE could monitor the first control region until the time gap is over. However, after the time window is over, the UE does not monitor the second control region until the time gap is over.

In one embodiment, after the time window is over, the UE could monitor the first control region until the transmission (opportunity) of the second request. However, after the time window is over, the UE does not monitor the second control region until the time gap is over. More specifically, after the time window is over, the UE could monitor the first control region until a time offset after the transmission (opportunity) of the second request. However, after the time window is over, the UE does not monitor the second control region until a time offset after the transmission (opportunity) of the second request.

In one embodiment, after the time window is over, the UE could monitor the first control region until starting time of a time window associated with the second request. However, after the time window is over, the UE does not monitor the second control region until starting time of a time window associated with the second request. More specifically, the UE could monitor the first control region via the second link and/or the candidate beam. Alternatively, the UE could monitor the first control region via the first link.

In one embodiment, the UE monitors the first control region could mean the UE monitors at least downlink control information or downlink transmission in the same time domain resources and/or in the same frequency domain resources as that of the first control region.

Alternative 2:

In one embodiment, after the time window is over, the network could transmit the response in the second control region. However, after the time window is over, the network does not transmit the response in the first control region. More specifically, after the time window is over, the network could transmit the response in the second control region until the time gap is over. However, after the time window is over, the network does not transmit the response in the first control region until the time gap is over.

In one embodiment, after the time window is over, the network could transmit the response in the second control region until reception of the second request. However, after the time window is over, the network does not transmit the response in the first control region until reception of the second request. More specifically, after the time window is over, the network could transmit the response in the second control region until a time offset after reception of the second request. However, after the time window is over, the network does not transmit the response in the first control region until a time offset after reception of the second request. In one embodiment, after the time window is over, the network could transmit the response in the second control region until starting time of a time window associated with the received second request. After transmitting the first request, the network does not transmit the response in the first control region.

In one embodiment, the network could transmit the response in the second control region via the second link. More specifically, the network could transmit the response in the second control region via the candidate beam. Alternatively, the network could transmit the response in the second control region via the first link. In one embodiment, the network transmits the response in the second control region could mean the network transmits at least downlink control information or downlink transmission in the same time domain resources and/or in the same frequency domain resources as that of the second control region.

In one embodiment, after the time window is over, the UE could monitor the second control region. However, after the time window is over, the UE may not monitor the first control region. In one embodiment, after the time window is over, the UE could monitor the second control region until the time gap is over. However, after the time window is over, the UE may not monitor the first control region until the time gap is over.

In one embodiment, after the time window is over, the UE monitors the second control region until the transmission (opportunity) of the second request. However, after the time window is over, the UE does not monitor the first control region until the transmission (opportunity) of the second request. In one embodiment, after the time window is over, the UE could monitor the second control region until a time offset after the transmission (opportunity) of the second request. However, after the time window is over, the UE does not monitor the first control region until a time offset after the transmission (opportunity) of the second request. In one embodiment, after the time window is over, the UE could monitor the second control region until starting time of a time window associated with the second request. After transmitting the first request, the UE does not monitor the first control region.

In one embodiment, the UE could monitor the second control region via the second link. More specifically, the UE could monitor the second control region via the candidate beam. Alternatively, the UE could monitor the second control region via the first link. In one embodiment, the UE monitors the second control region could mean the UE monitors at least downlink control information or downlink transmission in the same time domain resources and/or in the same frequency domain resources as that of the second control region.

In Alternative 2, if the UE does not receive the response within the time window associated with the first request, the UE could trigger a second request transmission and keep receiving and/or monitoring the second control region for the response associated with the first request during the time gap. More specifically, if the UE does not receive the response and the time window associated with the first request expires, the UE could trigger a second request transmission and keep receiving and/or monitoring the second control region for the response associated with the first request during the time gap.

Alternative 3:

In one embodiment, after the time window is over, the network could transmit the response in the first control region via the first link or the second control region via the second link. More specifically, after the time window is over, the network could transmit the response in the first control region via the first link or the second control region via the second link until the time gap is over. Alternatively, after the time window is over, the network could transmit the response in the first control region via the first link or the second control region via the second link until reception of the second request. More specifically, after the time window is over, the network could transmit the response in the first control region via the first link or the second control region via the second link until a time offset after reception of the second request. In one embodiment, after the time window is over, the network could transmit the response in the first control region via the first link or the second control region via the second link until starting time of a time window associated with the received second request.

In one embodiment, the network could transmit the response in the first control region via the first link or the second control region via the second link could mean the network transmits at least downlink control information or downlink transmission in the same time domain resources as that of the first control region via the first link and the same time domain resources as that of the second control region via the second link. In one embodiment, the network transmits the response in the first control region via the first link and the second control region via the second link could mean the network transmits at least downlink control information or downlink transmission in the same frequency domain resources as that of the first control region via the first link and the same frequency domain resources as that of the second control region via the second link.

In one embodiment, after the time window is over, the UE could monitor (simultaneously) on the first control region via the first link and the second control region via the second link. More specifically, after the time window is over, the UE could monitor (simultaneously) the first control region via the first link and the second control region via the second link until the time gap is over. Alternatively, after the time window is over, the UE could monitor (simultaneously) on the first control region via the first link and the second control region via the second link until the transmission (opportunity) of the second request. More specifically, after the time window is over, the UE could monitor (simultaneously) on the first control region via the first link and the second control region via the second link until a time offset after the transmission (opportunity) of the second request. Furthermore, after the time window is over, the UE could also monitor (simultaneously) on the first control region via the first link and the second control region via the second link until starting time of a time window associated with the second request.

In one embodiment, the UE monitors (simultaneously) on the first control region via the first link and the second control region via the second link could mean the UE monitors at least downlink control information or downlink transmission in the same time domain resources as that of the first control region via the first link and the same time domain resources as that of the second control region via the second link. Alternatively, the UE monitors (simultaneously) on the first control region via the first link and the second control region via the second link could mean the UE monitors at least downlink control information or downlink transmission in the same frequency domain resources as that of the first control region via the first link and the same frequency domain resources as that of the second control region via the second link.

In one embodiment, the UE could receive and/or monitor a set of PDCCH candidates, wherein the first control region comprises part of the set of PDCCH candidates and the second control region comprises remaining part of the set of PDCCH candidates.

Alternative 4:

In one embodiment, after the time window is over, the network does not transmit the response in the first control region and second control region. More specifically, after the time window is over, the network does not transmit the response in the first control region via the first link and second control region via the second link. In one embodiment, after the time window is over, the network does not transmit the response in the first control region and second control region until the time gap is over. Also, after the time window is over, the network does not transmit the response in the first control region and second control region until reception of the second request. Furthermore, after the time window is over, the network does not transmit the response in the first control region and second control region until a time offset after reception of the second request. In addition, after the time window is over, the network does not transmit the response in the first control region and second control region until starting time of a time window associated with the received second request.

In one embodiment, after the time window is over, the UE monitors neither the first control region nor second control region. More specifically, after the time window is over, the UE monitors neither the first control region via the first link nor second control region via the second link. In one embodiment, after the time window is over, the UE monitors neither the first control region nor second control region until the time gap is over. Also, after the time window is over, the UE monitors neither the first control region nor second control region until the transmission (opportunity) of the second request. Furthermore, after the time window is over, the UE monitors neither the first control region nor second control region until a time offset after the transmission (opportunity) of the second request. In addition, after the time window is over, the UE monitors neither the first control region nor second control region until starting time of a time window associated with the second request.

In Alternative 4, the UE is not expected to receive the response (associated with the first request) during the time gap. Furthermore, the UE does not receive and/or monitor any control region for the response during the time gap. It may be for power saving.

In one embodiment, the UE could receive and/or measure downlink reference signaling, but may not receive and/or monitor any control region for the response during the time gap. The downlink reference signaling that the UE could receive and/or measure may comprise synchronization signal and/or CSI-RS. The UE could receive and/or measure downlink reference signaling for finding candidate beam(s).

In one embodiment, the lower layer may indicate to the higher layer that the time window is over and/or the response is not received. In one embodiment, the lower layer may indicate to the higher layer that the response monitoring (by the lower layer) stops. The lower lay may also indicate to the higher layer that the second request is transmitted. In one embodiment, the lower layer could be the PHY layer, and the higher layer could be the MAC layer.

Furthermore, this alternative may not be related to DRX.

Alternative 5:

In one embodiment, after the time window is over, the network could transmit at least the downlink control information or downlink transmission based on an indication. More specifically, after the time window is over, the network could transmit at least the downlink control information or downlink transmission based on the indication during the time gap.

In one embodiment, the network could transmit at least the downlink control information or downlink transmission on the first control region via the second link based on the indication. More specifically, the network could transmit at least the downlink control information or downlink transmission on the second control region via the second link based on the indication.

In one embodiment, the network could transmit at least the downlink control information or downlink transmission (simultaneously) on the first control region via the first link and the second control region via the second link based on the indication. More specifically, the network could transmit at least the downlink control information or downlink transmission on the first control region via the second link or the second control region via the second link based on the indication. However, the network does not transmit the response in the first control region (via the first link) and the second control region (via the second link) based on the indication.

In embodiment, after the time window is over, the network could transmit at least the downlink control information or downlink transmission based on the indication until the time gap is over. In one embodiment, after the time window is over, the network could transmit at least downlink control information or downlink transmission based on the indication until reception of the second request. Furthermore, after the time window is over, the network could transmit at least downlink control information or downlink transmission based on the indication until a time offset after reception of the second request. In addition, after the time window is over, the network could transmit at least downlink control information or downlink transmission based on the indication until starting time of a time window associated with the received second request.

In one embodiment, the network transmits on the first control region could mean the network transmits at least the downlink control information or downlink transmission in the same time domain resources and/or in the same frequency domain resources as that of the first control region.

In one embodiment, the network transmits on the second control region could mean the network transmits at least the downlink control information or downlink transmission in the same time domain resources and/or in the same frequency domain resources as that of the second control region.

In one embodiment, the indication could be a configuration from higher layer. More specifically, the indication could be a MAC-CE or transmitted by a MAC-CE. Alternatively, the indication could be a dynamic signaling or transmitted by a dynamic signaling, wherein the dynamic signaling can be DCI.

In one embodiment, after the time window is over, the UE could monitor at least the downlink control information or downlink transmission based on an indication. More specifically, after the time window is over, the UE could monitor at least the downlink control information or downlink transmission based on the indication during the time gap.

In one embodiment, the UE could monitor at least the downlink control information or downlink transmission on the first control region via the second link based on the indication. Alternatively, the UE could monitor at least the downlink control information or downlink transmission on the second control region via the second link based on the indication.

In one embodiment, the UE could monitor at least the downlink control information or downlink transmission (simultaneously) on the first control region via the first link and the second control region via the second link based on the indication. In one embodiment, the UE could monitor at least the downlink control information or downlink transmission (simultaneously) on the first control region via the second link and the second control region via the second link based on the indication. In one embodiment, the UE monitors neither the first control region (via the first link) nor the second control region (via the second link) based on the indication.

In one embodiment, after the time window is over, the UE could monitor at least the downlink control information or downlink transmission based on the indication until the time gap is over. Furthermore, after the time window is over, the UE could monitor at least the downlink control information or downlink transmission based on the indication until the transmission (opportunity) of the second request. In addition, after the time window is over, the UE could monitor at least the downlink control information or downlink transmission based on the indication until a time offset after the transmission (opportunity) of the second request. Also, after the time window is over, the UE could monitor at least the downlink control information or downlink transmission based on the indication until starting time of a time window associated with the second request.

In one embodiment, the UE monitors the first control region could mean the UE monitors at least the downlink control information or downlink transmission in the same time domain resources and/or in the same frequency domain resources as that of the first control region.

In one embodiment, the UE monitors the second control region could mean the UE monitors at least downlink control information or downlink transmission in the same time domain resources and/or in the same frequency domain resources as that of the second control region.

In one embodiment, the indication could be a configuration from higher layer. More specifically, the indication could be a MAC-CE or transmitted by MAC-CE. Alternatively, the indication could be a dynamic signaling or transmitted by a dynamic signaling, wherein the dynamic signaling can be DCI.

The alternative can be implemented in at least the following examples.

Example 1

The indication could be a 2-bit field or signal. The indication could indicate one of the following exemplary options.

Option 1: The UE monitors at least downlink control information or downlink transmission on the first control region via the second link during the time gap.

Option 2: The UE monitors at least downlink control information or downlink transmission on the second control region via the second link during the time gap.

Option 3: The UE monitors at least downlink control information or downlink transmission (simultaneously) on the first control region via the first link and the second control region via the second link during the time gap.

Option 4: The UE monitors neither the first control region via the first link nor the second control region during the time gap.

As an example, Option 1 could correspond to "00"; Option 2 could correspond to "01"; Option 3 could correspond to "10"; and Option 4 could correspond to "11".

The order or content of the above options are just for example and not limited. The bit value and the corresponding mapping relation are just for example and not limited.

Example 2

The indication could be a 1-bit field or signal. Furthermore, the UE could be configured as a default monitoring behavior during the time gap. The indication could indicate one of the following exemplary options.

Option 1: The UE monitors at least downlink control information or downlink transmission on the first control region via the second link during the time gap.

Option 2: The UE monitors at least downlink control information or downlink transmission on the second control region via the second link during the time gap.

Option 3: The UE monitors at least downlink control information or downlink transmission (simultaneously) on the first control region via the first link and the second control region via the second link during the time gap.

Option 4: The UE monitors neither the first control region via the first link nor the second control region during the time gap.

To be more specific, the default behavior can be Option 1. As an example, the indication could indicate Option 2 or Option 3, e.g. "0" could correspond to Option 2 and "1" could correspond to Option 3. If the UE receives the indication indicating "0", the UE could monitor at least the downlink control information or downlink transmission on the second control region via the second link during the time gap instead of the behavior described in Option 1.

The indication can also be a bitmap or table or list, which is not limited to the method in the above example(s).

Dependent or independent with the above alternatives, the time window can be defined or redefined as a time interval for the UE to decide whether to transmit the second request/retransmit the beam failure recovery request or not after the UE transmits a first request. In one embodiment, after the UE transmits a first request, if the UE does not receive the response in the time window (associated with the first request), the UE may transmit the second request/retransmit the beam failure recovery request. In one embodiment, the UE does not receive the response in the time window could mean that the UE does not receive the response and a timer for the time window is expired.

In one embodiment, the timer for the time duration could start or restart if the UE transmits the second request/retransmit the beam failure recovery request. The first request and the second request may be transmitted via different link. Alternatively, the first request and the second request may be transmitted via the same link. Furthermore, the first request and the second request may be transmitted via different candidate beam. Alternatively, the first request and the second request may be transmitted via the same candidate beam.

In one embodiment, the UE could transmit the first request via the second link, and the second request via a link that may or may not be the same as the second link. Furthermore, the UE could transmit the first request via the candidate beam and the second request via a candidate beam that may or may not be the same as the candidate beam of the first request. The UE may or may not reselect or re-determine another candidate beam for the second request.

In one embodiment, if the UE does not receive the response in the time window, the UE may monitor or keep monitoring the response after the time window. It could mean that the UE may monitor or keep monitoring the response even the timer for time window is expired. Furthermore, it could mean that the UE may monitor or keep monitoring the response even the timer for time window is not running.

In one embodiment, if the UE does not receive the response in the time window, the UE may monitor or keep monitoring the response in the time gap. More specifically, if the UE does not receive the response in the time window, the UE may monitor or keep monitoring the response until the transmission (opportunity) of the second request. Furthermore, if the UE does not receive the response in the time window, the UE may monitor or keep monitoring the response until a time offset after the transmission (opportunity) of the second request. In addition, if the UE does not receive the response in the time window, the UE may monitor or keep monitoring the response until starting time of a time window associated with the second request. The UE could use one or more than one of the above alternative(s) to monitor the response.

In one embodiment, "link" throughout the description or the embodiment can be replaced with "connection". The solutions and alternatives applied to beam (failure) recovery procedure regardless of the kind of resources through which the request is transmitted. The network may comprise a gNB, a TRP, a network node, or a relay node.

Furthermore, the solutions and alternatives of this invention are not limited to address the CORESET monitoring behavior after the gNB response is missed or gNB response is not received by UE. The solutions and alternatives of this invention can be applied both to UE is configured with a single carrier or cell and UE is configured with multiple carriers or cells.

Figure 16:
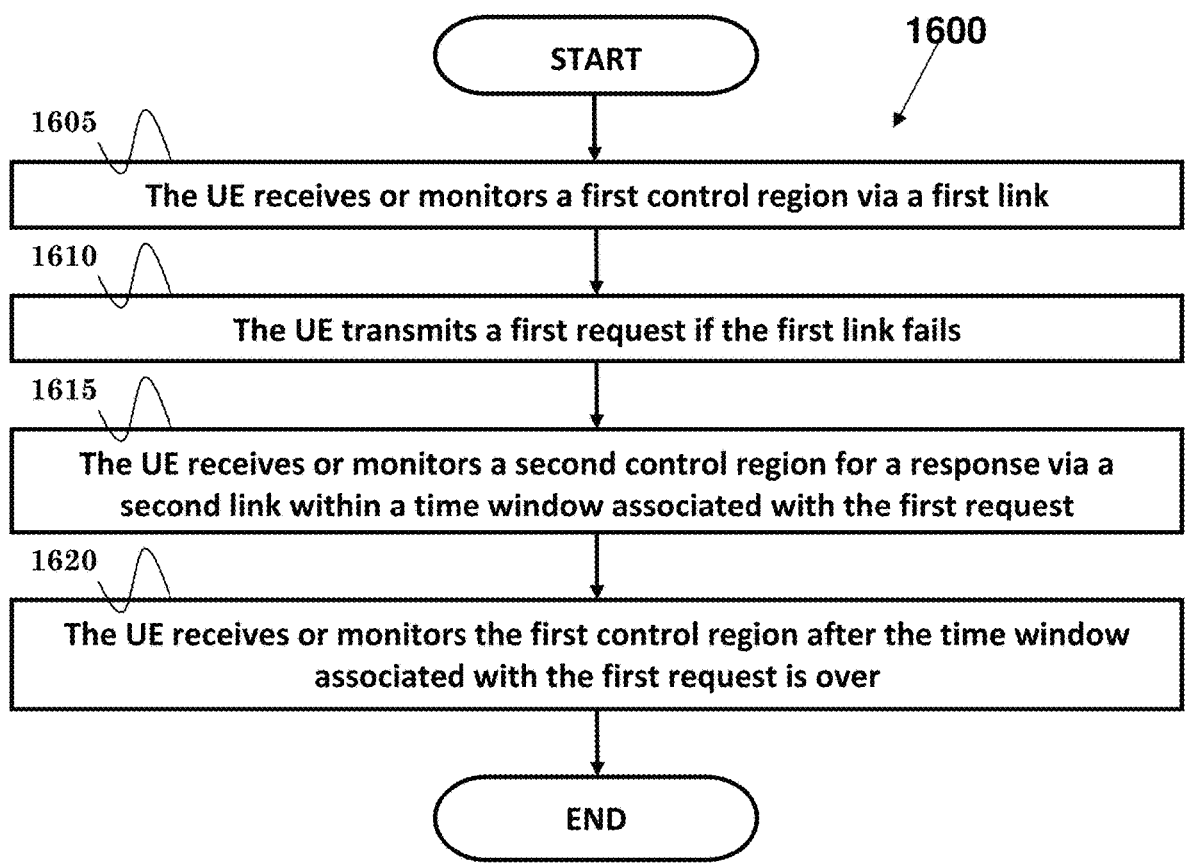
FIG. 16 is a flow chart according to one exemplary embodiment.

FIG. 16 is a flow chart 1600 according to one exemplary embodiment from the perspective of a UE. In step 1605, the UE receives and/or monitors a first control region via a first link. In step 1610, the UE transmits a first request if the first link fails. In step 1615, the UE receives and/or monitors a second control region for a response via a second link within a time window associated with the first request. In step 1620, the UE receives and/or monitors the first control region after the time window associated with the first request is over.

In one embodiment, the UE receives and/or monitors the first control region after the time window associated with the first request is over if the UE does not receive the response successfully within the time window associated with the first request. In one embodiment, the UE receives and/or monitors the first control region after the time window associated with the first request is over if the UE receives the response successfully within the time window associated with the first request. In one embodiment, the UE receives and/or monitors the first control region after the time window associated with the first request is over.

In one embodiment, if the UE does not receive the response successfully within the time window associated with the first request, the UE could transmit a second request and could receive and/or monitor the second control region for a response via a second link within a time window associated with the second request. More specifically, after the time window associated with the first request is over, the UE could receive and/or monitor the first control region until a starting time of a time window associated with the second request. Alternatively, after the time window associated with the first request is over, the UE could receive and/or monitor the first control region until a transmission time unit of the second request.

In one embodiment, the UE monitors the first control region means the UE monitors at least downlink control information or downlink transmission in the same frequency and/or time domain resources as that of the first control region.

In one embodiment, after the time window associated with the first request is over, the UE could receive and/or monitor the first control region via the first link. However, after the time window associated with the first request is over, the UE does not receive and/or monitor the second control region via the second link.

In one embodiment, the first control region could be a CORESET (Control Resource Set) configured for monitoring downlink control signaling which indicates DL (Downlink) assignment(s) and/or UL (Uplink) grant(s), and/or the second control region is a CORESET configured for monitoring gNB response after transmitting a beam failure recovery request. Furthermore, the first link could include at least one DL (Downlink) beam pair link in a single carrier. In addition, the first link fails could mean the quality of all associated control channels fall low enough (e.g. comparison with a threshold), which means falls below a threshold.

In one embodiment, the first request could be a beam failure recovery request indicating a downlink reference signal, wherein the UE detects and/or finds a candidate beam based on measurement of the downlink reference signal. Furthermore, the second request could be a beam failure recovery request indicating a downlink reference signal, wherein the UE detects and/or finds a candidate beam based on measurement of the downlink reference signal. The second link could include a candidate beam which is spatially QCL'ed with a downlink reference signal indicated by the first request.

Referring back to FIGS. 3 and 4, in one exemplary embodiment of a UE, the device 300 includes a program code 312 stored in the memory 310. The CPU 308 could execute program code 312 to enable the UE (i) to receive and/or monitor a first control region via a first link, (ii) to transmit a first request if the first link fails, (iii) to receive and/or monitor a second control region for a response via a second link within a time window associated with the first request, and (iv) to receive and/or monitor the first control region after the time window associated with the first request is over. Furthermore, the CPU 308 can execute the program code 312 to perform all of the above-described actions and steps or others described herein.

Figure 17:
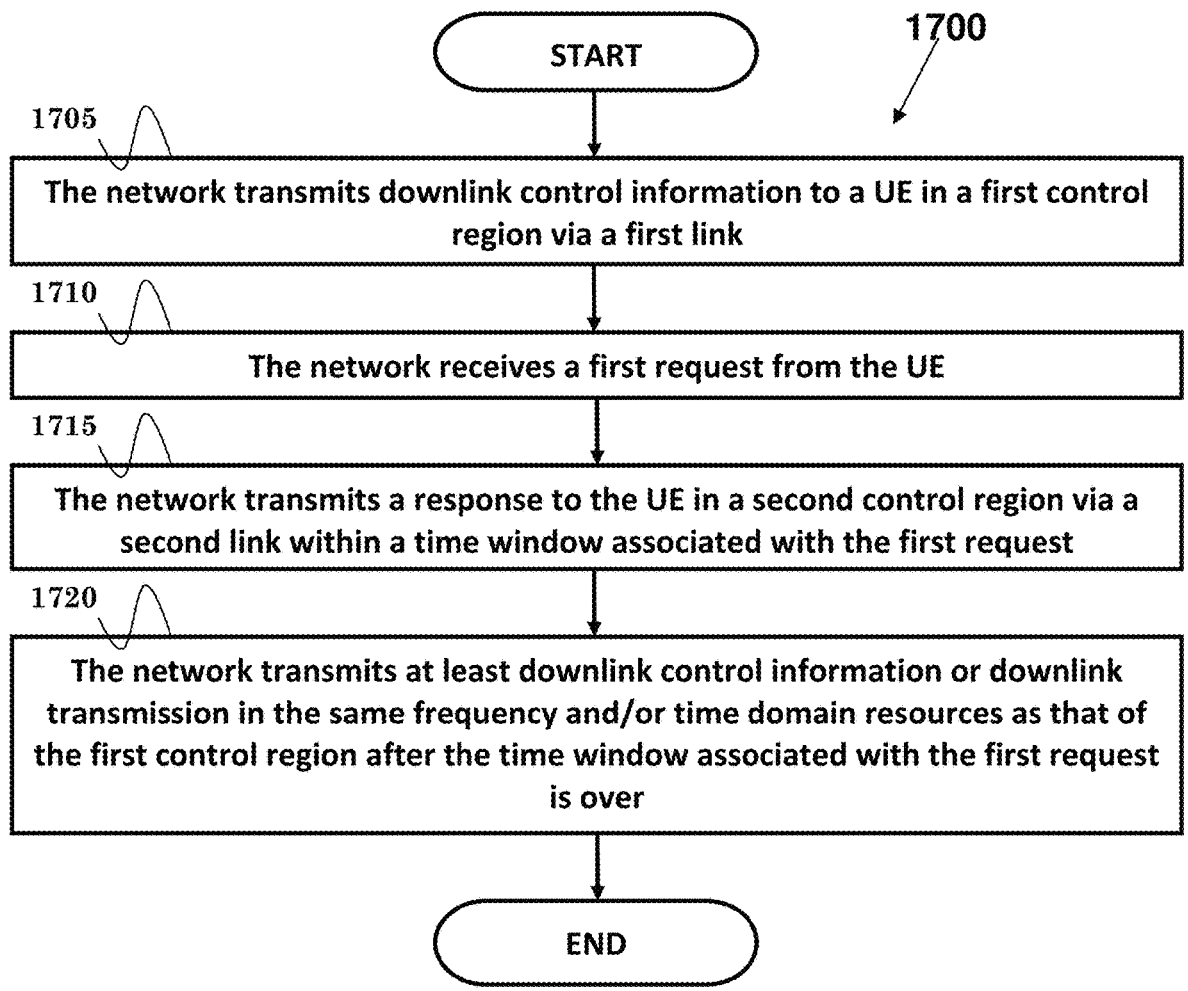
FIG. 17 is a flow chart according to one exemplary embodiment.

FIG. 17 is a flow chart 1700 according to one exemplary embodiment from the perspective of a network. In step 1705, the network transmits downlink control information to a UE in a first control region via a first link. In step 1710, the network receives a first request from the UE. In step 1715, the network transmits a response to the UE in a second control region via a second link within a time window associated with the first request. In step 1720, the network transmits at least downlink control information or downlink transmission in the same frequency and/or time domain resources as that of the first control region after the time window associated with the first request is over.

In one embodiment, the network transmits at least downlink control information or downlink transmission in the same frequency and/or time domain resources as that of the first control region after the time window associated with the first request is over if the network does not receive an acknowledgement successfully within the time window associated with the first request. In one embodiment, the network transmits at least downlink control information or downlink transmission in the same frequency and/or time domain resources as that of the first control region after the time window associated with the first request is over if the network receives an acknowledgement successfully within the time window associated with the first request. In one embodiment, the network transmits at least downlink control information or downlink transmission in the same frequency and/or time domain resources as that of the first control region after the time window associated with the first request is over.

In one embodiment, the first control region could be a CORESET (Control Resource Set) configured for transmitting downlink control signaling which indicates DL (Downlink) assignment(s) and/or UL (Uplink) grant(s), and/or the second control region could be a CORESET configured for transmitting the response after receiving the first request.

In one embodiment, the first link includes at least one DL (Downlink) beam pair link in a single carrier. The second link could include a candidate beam which is spatially QCL'ed with a downlink reference signal indicated by the first request.

In one embodiment, after the time window associated with the first request is over, the network does not transmit the response in the second control region until reception of a second request or until starting time of a time window associated with a received second request. The first request and the second request could be a beam failure recovery request.

In one embodiment, the acknowledgement, comprising any of an uplink control signal (e.g. ACK/NACK), an uplink transmission (e.g. PUSCH, PUCCH and PRACH), a CSI (Channel State Information) reporting, and/or a beam report, is responsive of the response.

Referring back to FIGS. 3 and 4, in one exemplary embodiment of a network node, the device 300 includes a program code 312 stored in the memory 310. The CPU 308 could execute program code 312 to enable the network node (i) to transmit downlink control information to a UE in a first control region via a first link, (ii) to receive a first request from the UE, (iii) to transmit a response to the UE in a second control region via a second link within a time window associated with the first request, and (iv) to transmit at least downlink control information or downlink transmission in the same frequency and/or time domain resources as that of the first control region after the time window associated with the first request is over. Furthermore, the CPU 308 can execute the program code 312 to perform all of the above-described actions and steps or others described herein.

FIG. 18 is a flow chart 1800 according to one exemplary embodiment from the perspective of a network. In step 1805, the network transmits downlink control information in a first control region via a first link. In step 1810, the network receives a first request. In step 1815, the network transmits a response in a second control region via a second link within a time window. In step 1820, the network transmits the response in the first control region after the time window is over if the network does not receive acknowledgement successfully within the time window.

Referring back to FIGS. 3 and 4, in one exemplary embodiment of a network node, the device 300 includes a program code 312 stored in the memory 310. The CPU 308 could execute program code 312 to enable the network node (i) to transmit downlink control information in a first control region via a first link, (ii) to receive a first request, (iii) to transmit a response in a second control region via a second link within a time window, and (iv) to transmit the response in the first control region after the time window is over if the network does not receive acknowledgement successfully within the time window. Furthermore, the CPU 308 can execute the program code 312 to perform all of the above-described actions and steps or others described herein.

Figure 19:
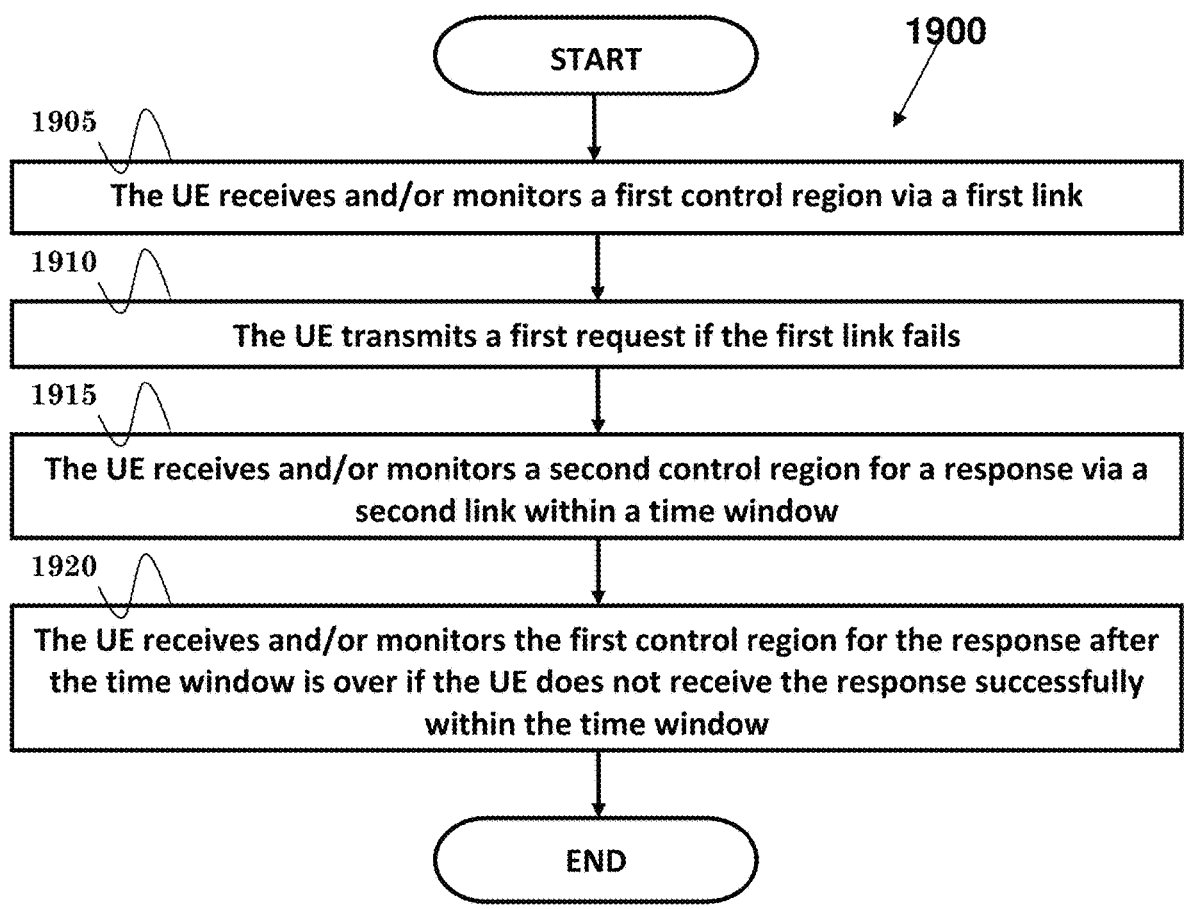
FIG. 19 is a flow chart according to one exemplary embodiment.

FIG. 19 is a flow chart 1900 according to one exemplary embodiment from the perspective of a UE. In step 1905, the UE receives and/or monitors a first control region via a first link. In step 1910, the UE transmits a first request if the first link fails. In step 1915, the UE receives and/or monitors a second control region for a response via a second link within a time window. In step 1920, the UE receives and/or monitors the first control region for the response after the time window is over if the UE does not receive the response successfully within the time window.

Referring back to FIGS. 3 and 4, in one exemplary embodiment of a UE, the device 300 includes a program code 312 stored in the memory 310. The CPU 308 could execute program code 312 to enable the UE (i) to receive and/or monitor a first control region via a first link, (ii) to transmit a first request if the first link fails, (iii) to receive and/or monitor a second control region for a response via a second link within a time window, and (iv) to receive and/or monitor the first control region for the response after the time window is over if the UE does not receive the response successfully within the time window. Furthermore, the CPU 308 can execute the program code 312 to perform all of the above-described actions and steps or others described herein.

In the context of the embodiments shown in FIGS. 18 and 19, and described above, in one embodiment, the UE could receive and/or monitor the first control region for the response via the second link, after the time window is over and if the UE does not receive the response successfully within the time window. Furthermore, the UE could receive and/or monitor the first control region for the response via the first link, after the time window is over and if the UE does not receive the response successfully within the time window. The UE could also receive and/or monitor the first control region for the response in a time gap, after the time window is over and if the UE does not receive the response successfully within the time window.

In one embodiment, the UE could receive and/or monitor the first control region for the response until the time gap is over, until transmission (opportunity) of a second request, until a time offset after the transmission (opportunity) of a second request, or until starting time of a time window associated with a second request.

In one embodiment, the UE may not receive and/or monitor the second control region for the response in a time gap via the second link, after the time window is over if the UE does not receive the response successfully within the time window. More specifically, after the time window is over, the UE may not monitor the second control region until starting time of a time window associated with a second request.

In one embodiment, the UE receives and/or monitors the first control region for the response could mean the UE receives and/or monitors at least downlink control information or downlink transmission in the same time domain resources as that of the first control region. Alternatively, the UE receives and/or monitors the first control region for the response could mean the UE receives and/or monitors at least downlink control information or downlink transmission in the same frequency domain resources as that of the first control region.

Figure 20:
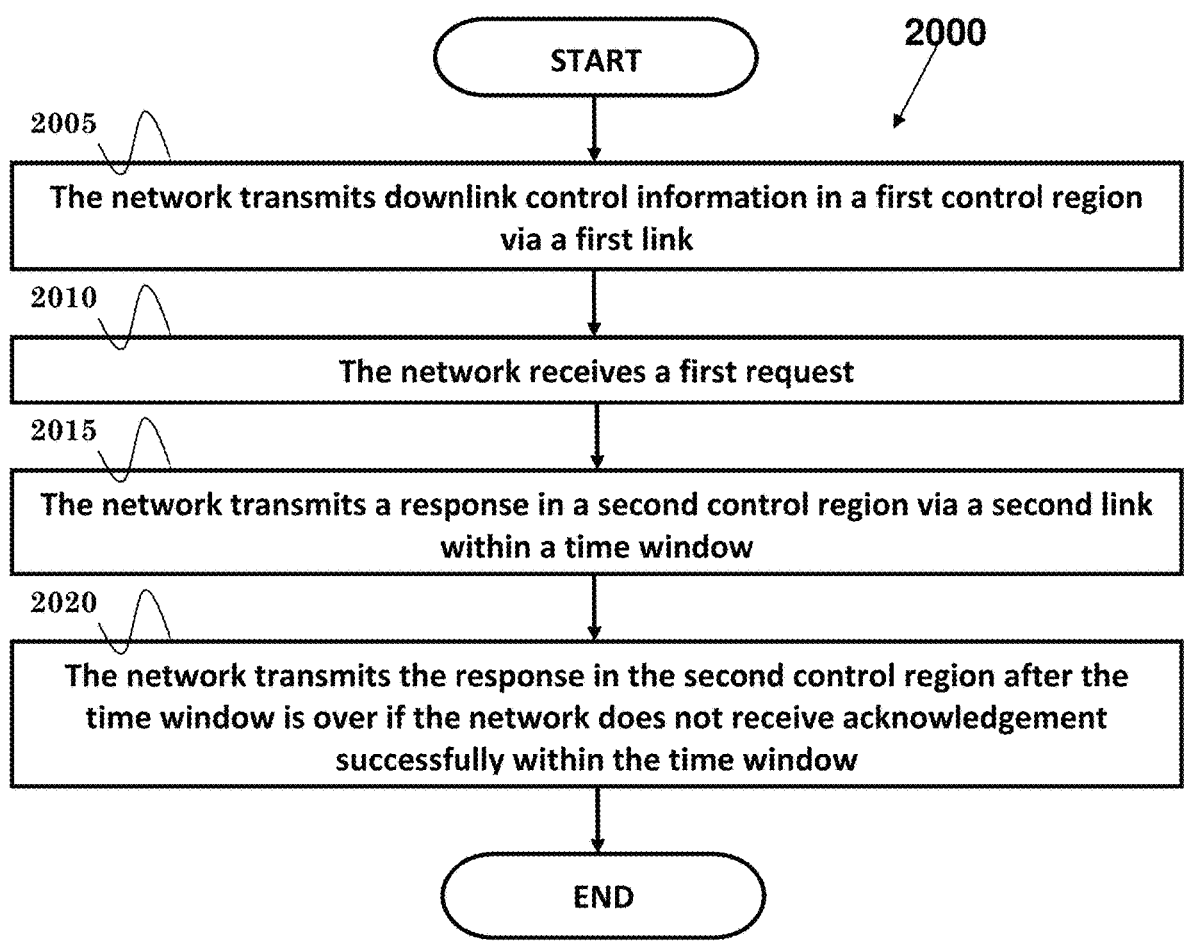
FIG. 20 is a flow chart according to one exemplary embodiment.

FIG. 20 is a flow chart 2000 according to one exemplary embodiment from the perspective of a network. In step 2005, the network transmits downlink control information in a first control region via a first link. In step 2010, the network receives a first request. In step 2015, the network transmits a response in a second control region via a second link within a time window. In step 2020, the network transmits the response in the second control region after the time window is over if the network does not receive acknowledgement successfully within the time window.

Referring back to FIGS. 3 and 4, in one exemplary embodiment of a network node, the device 300 includes a program code 312 stored in the memory 310. The CPU 308 could execute program code 312 to enable the network node (i) to transmit downlink control information in a first control region via a first link, (ii) to receive a first request, (iii) to transmit a response in a second control region via a second link within a time window, and (iv) to transmit the response in the second control region after the time window is over if the network does not receive acknowledgement successfully within the time window. Furthermore, the CPU 308 can execute the program code 312 to perform all of the above-described actions and steps or others described herein.

Figure 21:
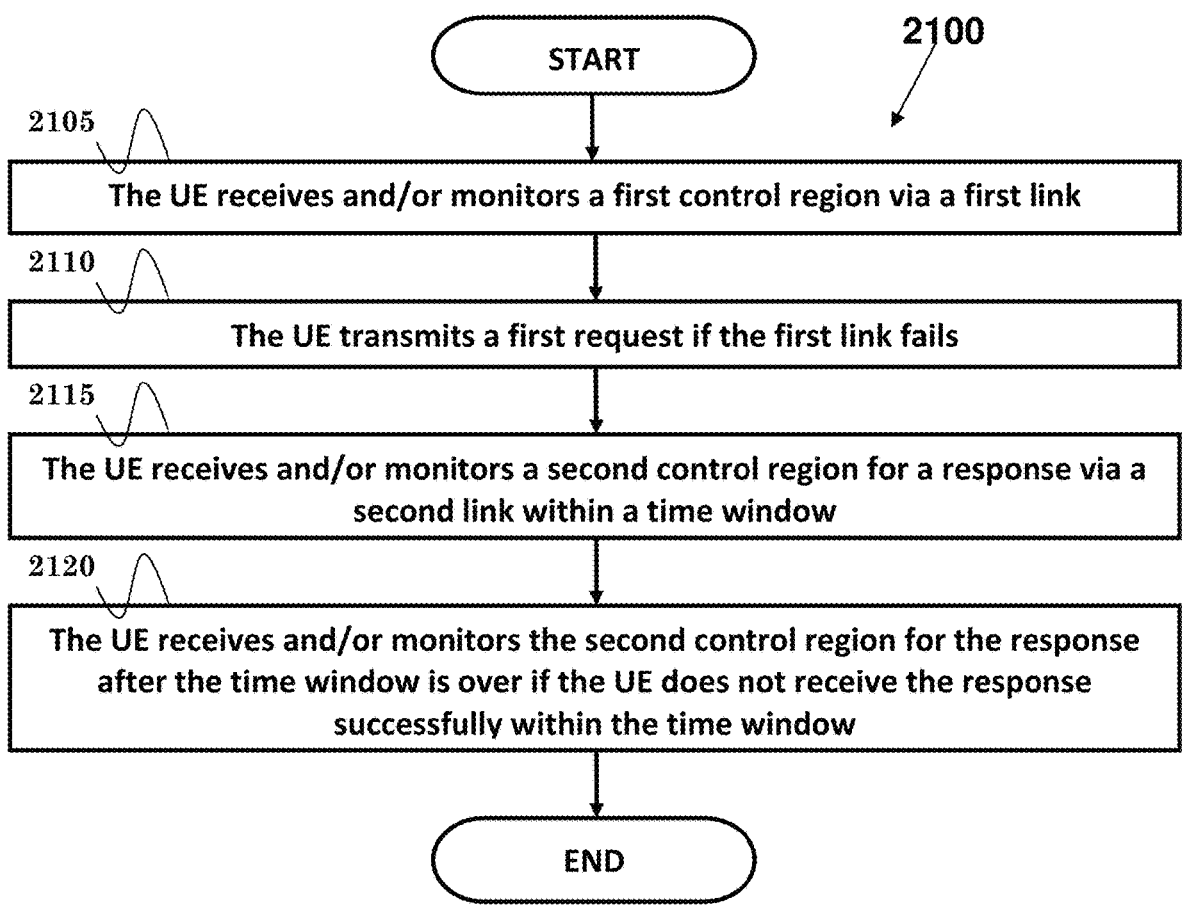
FIG. 21 is a flow chart according to one exemplary embodiment.

FIG. 21 is a flow chart 2100 according to one exemplary embodiment from the perspective of a UE. In step 2105, the UE receives and/or monitors a first control region via a first link. In step 2110, the UE transmits a first request if the first link fails. In step 2115, the UE receives and/or monitors a second control region for a response via a second link within a time window. In step 2120, the UE receives and/or monitors the second control region for the response after the time window is over if the UE does not receive the response successfully within the time window.

Referring back to FIGS. 3 and 4, in one exemplary embodiment of a UE, the device 300 includes a program code 312 stored in the memory 310. The CPU 308 could execute program code 312 to enable the UE (i) to receive and/or monitor a first control region via a first link, (ii) to transmit a first request if the first link fails, (iii) to receive and/or monitor a second control region for a response via a second link within a time window, and (iv) to receive and/or monitor the second control region for the response after the time window is over if the UE does not receive the response successfully within the time window. Furthermore, the CPU 308 can execute the program code 312 to perform all of the above-described actions and steps or others described herein.

In the context of the embodiments illustrated in FIGS. 20 and 21 and discussed above, in one embodiment, the UE could receive and/or monitor the second control region for the response via the second link, after the time window is over and if the UE does not receive the response successfully within the time window. The UE could also receive and/or monitor the second control region for the response in a time gap, after the time window is over and if the UE does not receive the response successfully within the time window. More specifically, the UE could receive and/or monitor the second control region for the response until the time gap is over.

In one embodiment, the UE may not receive or monitor the first control region for the response in a time gap via the second link, after the time window is over if the UE does not receive the response successfully within the time window. More specifically, after transmitting the first request, the UE may not monitor the first control region.

In one embodiment, the UE receives and/or monitors the second control region for the response could mean the UE receives and/or monitors at least downlink control information or downlink transmission in the same time domain resources and/or the same frequency domain resources as that of the second control region.

Figure 22:
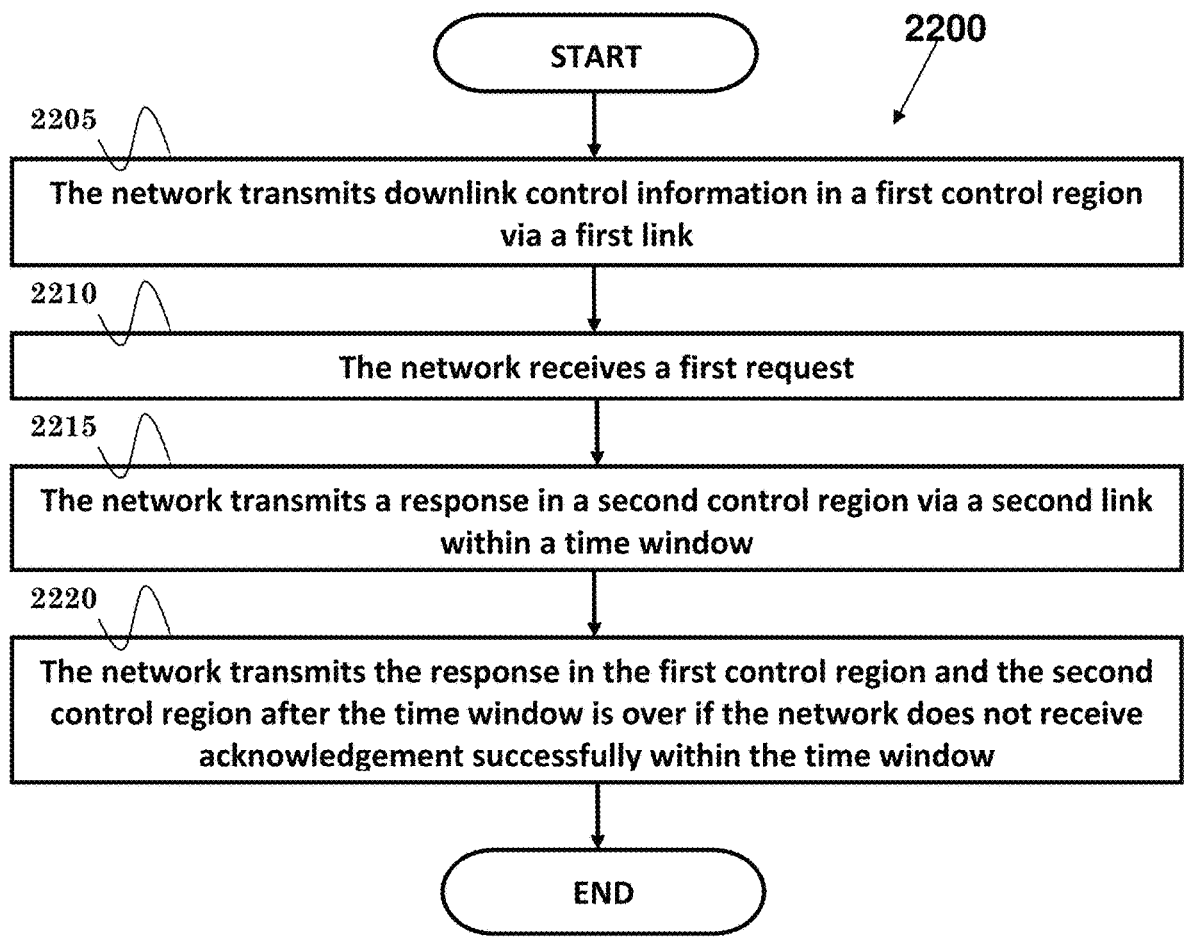
FIG. 22 is a flow chart according to one exemplary embodiment.

FIG. 22 is a flow chart 2200 according to one exemplary embodiment from the perspective of a network. In step 2205, the network transmits downlink control information in a first control region via a first link. In step 2210, the network receives a first request. In step 2215, the network transmits a response in a second control region via a second link within a time window. In step 2220, the network transmits the response in the first control region and the second control region after the time window is over if the network does not receive acknowledgement successfully within the time window.

Referring back to FIGS. 3 and 4, in one exemplary embodiment of a network node, the device 300 includes a program code 312 stored in the memory 310. The CPU 308 could execute program code 312 to enable the network node (i) to transmit downlink control information in a first control region via a first link, (ii) to receive a first request, (iii) to transmit a response in a second control region via a second link within a time window, and (iv) to transmit the response in the first control region and the second control region after the time window is over if the network does not receive acknowledgement successfully within the time window. Furthermore, the CPU 308 can execute the program code 312 to perform all of the above-described actions and steps or others described herein.

Figure 23:
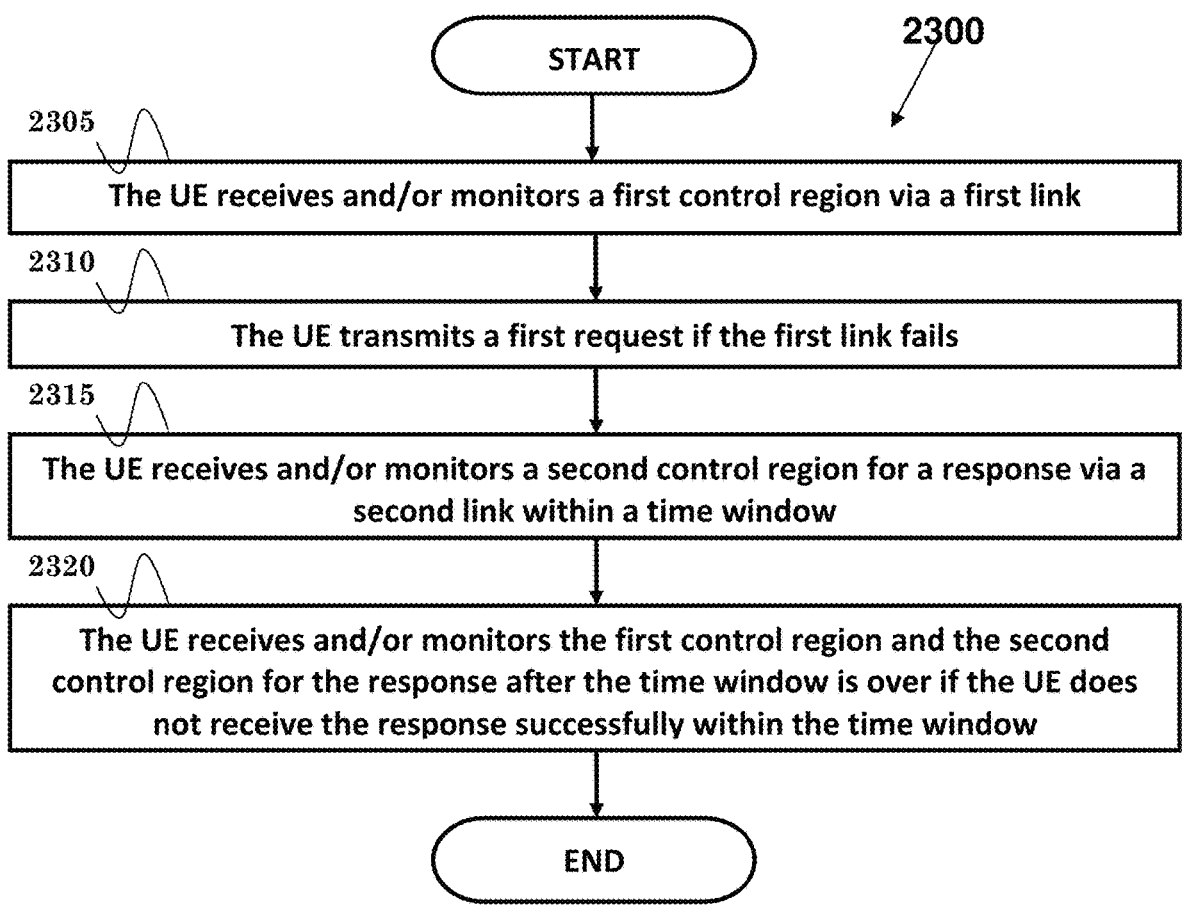
FIG. 23 is a flow chart according to one exemplary embodiment.

FIG. 23 is a flow chart 2300 according to one exemplary embodiment from the perspective of a UE. In step 2305, the UE receives and/or monitors a first control region via a first link. In step 2310, the UE transmits a first request if the first link fails. In step 2315, the UE receives and/or monitors a second control region for a response via a second link within a time window. In step 2320, the UE receives and/or monitors the first control region and the second control region for the response after the time window is over if the UE does not receive the response successfully within the time window.

Referring back to FIGS. 3 and 4, in one exemplary embodiment of a UE, the device 300 includes a program code 312 stored in the memory 310. The CPU 308 could execute program code 312 to enable the UE (i) to receive and/or monitor a first control region via a first link, (ii) to transmit a first request if the first link fails, (iii) to receive and/or monitor a second control region for a response via a second link within a time window, and (iv) to receive and/or monitor the first control region and the second control region for the response after the time window is over if the UE does not receive the response successfully within the time window. Furthermore, the CPU 308 can execute the program code 312 to perform all of the above-described actions and steps or others described herein.

In the context of the embodiments shown in FIGS. 22 and 23 and discussed above, in one embodiment, the UE could receive and/or monitor a set of PDCCH (Physical Downlink Control Channel) candidates, wherein the first control region comprises part of the set of PDCCH candidates and the second control region comprises remaining part of the set of PDCCH candidates. The UE could receive or monitor the first control region for the response via the first link and the second control region for the response via the second link, after the time window is over and if the UE does not receive the response successfully within the time window. The UE could also receive and/or monitor the first control region for the response via the second link and the second control region for the response via the second link, after the time window is over and if the UE does not receive the response successfully within the time window. In addition, the UE could receive and/or monitor the first control region and the second control region for the response in a time gap, after the time window is over and if the UE does not receive the response successfully within the time window. More specifically, the UE could receive and/or monitor the first control region and the second control region for the response until the time gap is over.

In one embodiment, the UE receives and/or monitors the first control region and the second control region for the response could mean the UE receives and/or monitors at least downlink control information or downlink transmission in the same time domain resources and/or the same frequency domain resources as that of the first control region and the second control region.

Figure 24:
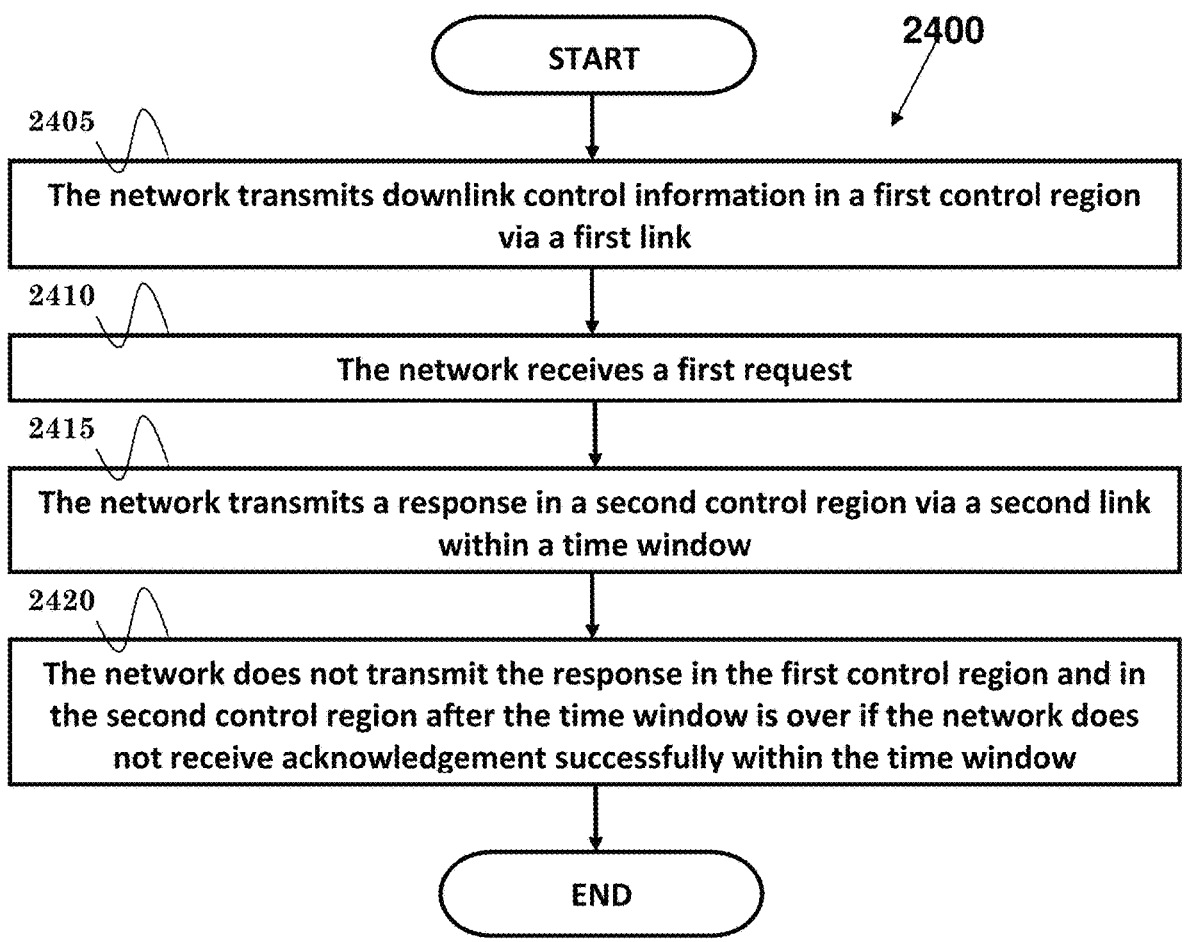
FIG. 24 is a flow chart according to one exemplary embodiment.

FIG. 24 is a flow chart 2400 according to one exemplary embodiment from the perspective of a network. In step 2405, the network transmits downlink control information in a first control region via a first link. In step 2410, the network receives a first request. In step 2415, the network transmits a response in a second control region via a second link within a time window. In step 2420, the network does not transmit the response in the first control region and in the second control region after the time window is over if the network does not receive acknowledgement successfully within the time window.

Referring back to FIGS. 3 and 4, in one exemplary embodiment of a network node, the device 300 includes a program code 312 stored in the memory 310. The CPU 308 could execute program code 312 to enable the network node (i) to transmit downlink control information in a first control region via a first link, (ii) to receive a first request, (iii) to transmit a response in a second control region via a second link within a time window, and (iv) to not transmit the response in the first control region and in the second control region after the time window is over if the network does not receive acknowledgement successfully within the time window. Furthermore, the CPU 308 can execute the program code 312 to perform all of the above-described actions and steps or others described herein.

Figure 25:
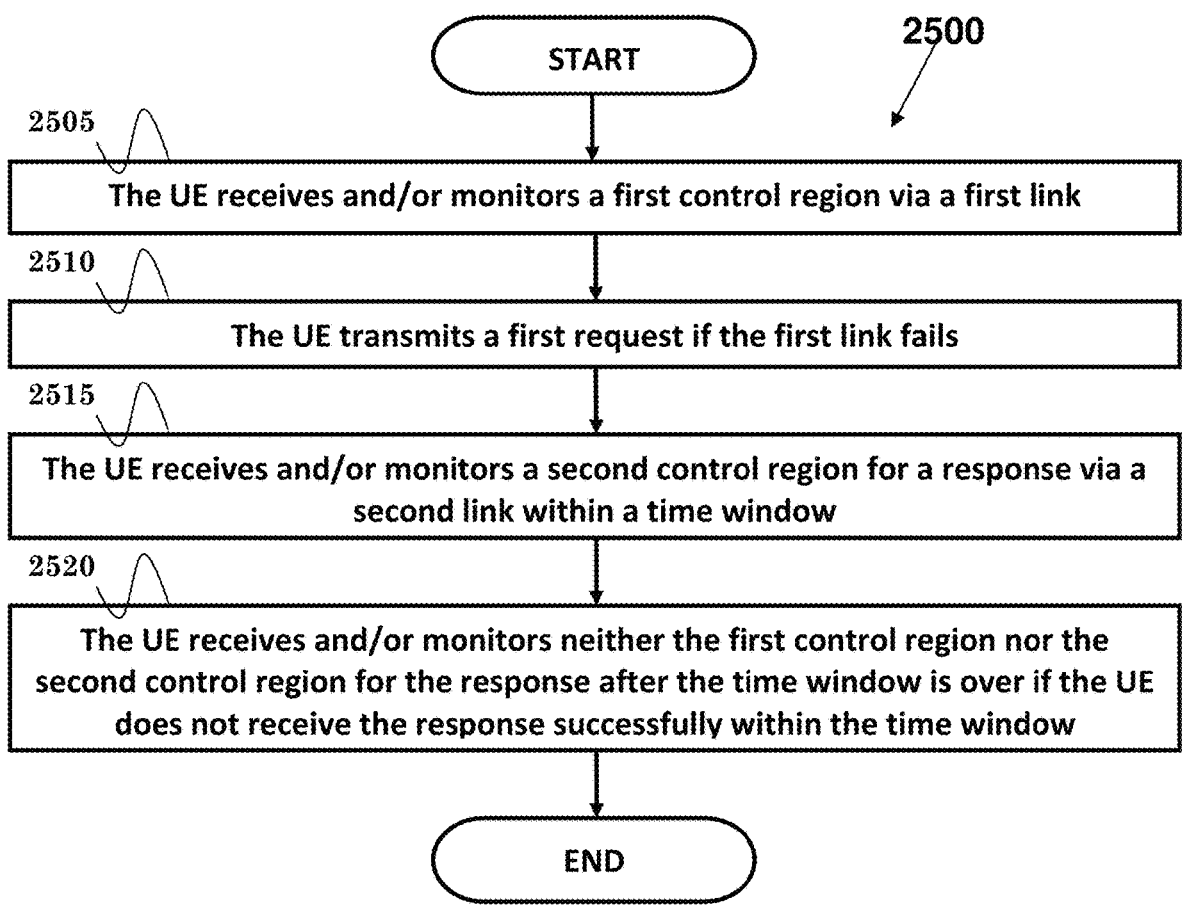
FIG. 25 is a flow chart according to one exemplary embodiment.

FIG. 25 is a flow chart 2500 according to one exemplary embodiment from the perspective of a UE. In step 2505, the UE receives and/or monitors a first control region via a first link. In step 2510, the UE transmits a first request if the first link fails. In step 2515, the UE receives and/or monitors a second control region for a response via a second link within a time window. In step 2520, the UE receives and/or monitors neither the first control region nor the second control region for the response after the time window is over if the UE does not receive the response successfully within the time window.

Referring back to FIGS. 3 and 4, in one exemplary embodiment of a UE, the device 300 includes a program code 312 stored in the memory 310. The CPU 308 could execute program code 312 to enable the UE (i) to receive and/or monitor a first control region via a first link, (ii) to transmit a first request if the first link fails, (iii) to receive and/or monitor a second control region for a response via a second link within a time window, and (iv) to receive and/or monitor neither the first control region nor the second control region for the response after the time window is over if the UE does not receive the response successfully within the time window. Furthermore, the CPU 308 can execute the program code 312 to perform all of the above-described actions and steps or others described herein.

In one embodiment, the UE may receive and/or monitor neither the first control region nor the second control region for the response in a time gap, after the time window is over and if the UE does not receive the response successfully within the time window. Furthermore, the UE may receive and/or monitor neither the first control region nor the second control region for the response until the time gap is over. However, the UE may not receive and/or monitor any control region for the response in a time gap, after the time window is over and if the UE does not receive the response successfully within the time window.

In one embodiment, the UE may receive and/or measure downlink reference signaling, but may not receive and/or monitor any control region for the response during the time gap.

Figure 26:
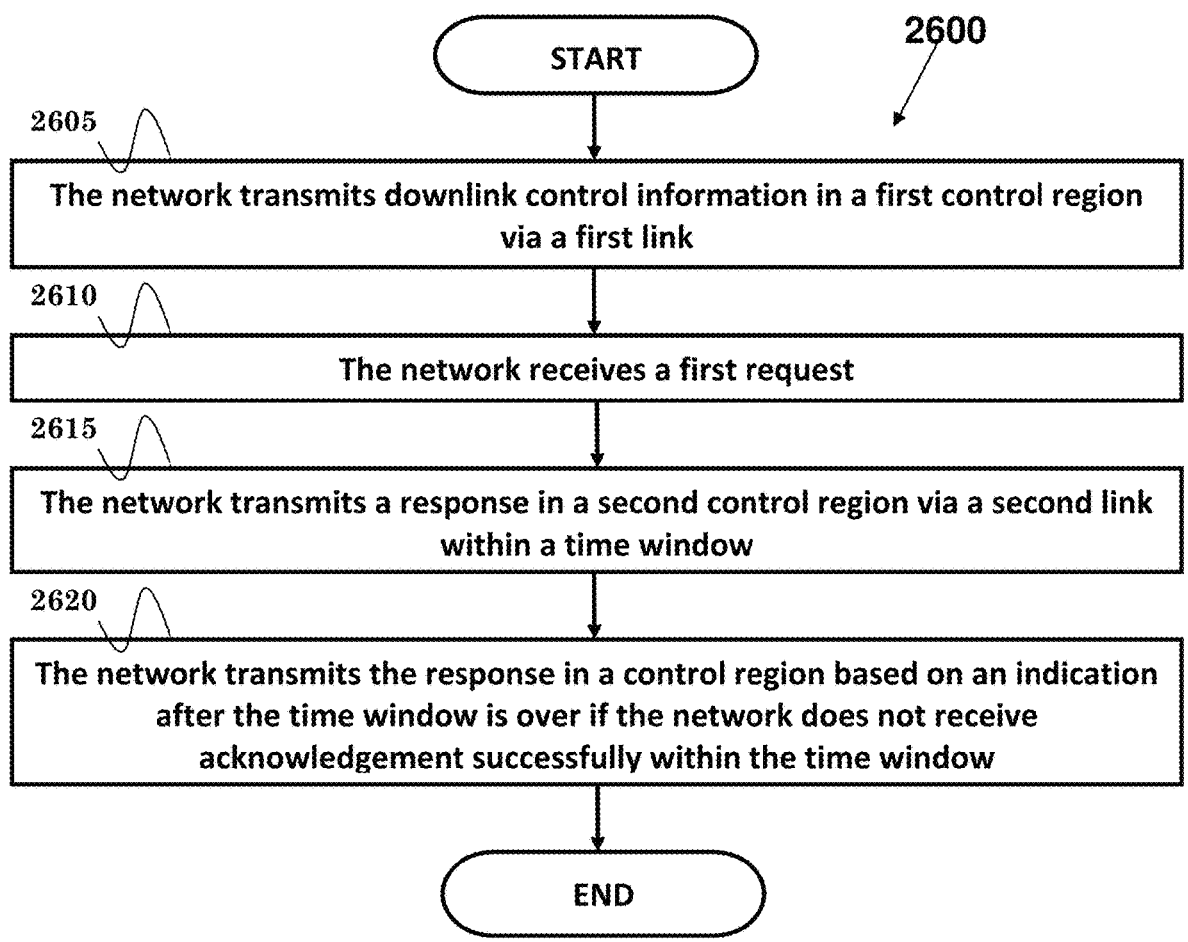
FIG. 26 is a flow chart according to one exemplary embodiment.

FIG. 26 is a flow chart 2600 according to one exemplary embodiment from the perspective of a network. In step 2605, the network transmits downlink control information in a first control region via a first link. In step 2610, the network receives a first request. In step 2615, the network transmits a response in a second control region via a second link within a time window. In step 2620, the network transmits the response in a control region based on an indication after the time window is over if the network does not receive acknowledgement successfully within the time window.

Referring back to FIGS. 3 and 4, in one exemplary embodiment of a network node, the device 300 includes a program code 312 stored in the memory 310. The CPU 308 could execute program code 312 to enable the network node (i) to transmit downlink control information in a first control region via a first link, (ii) to receive a first request, (iii) to transmit a response in a second control region via a second link within a time window, and (iv) to transmit the response in a control region based on an indication after the time window is over if the network does not receive acknowledgement successfully within the time window. Furthermore, the CPU 308 can execute the program code 312 to perform all of the above-described actions and steps or others described herein.

Figure 27:
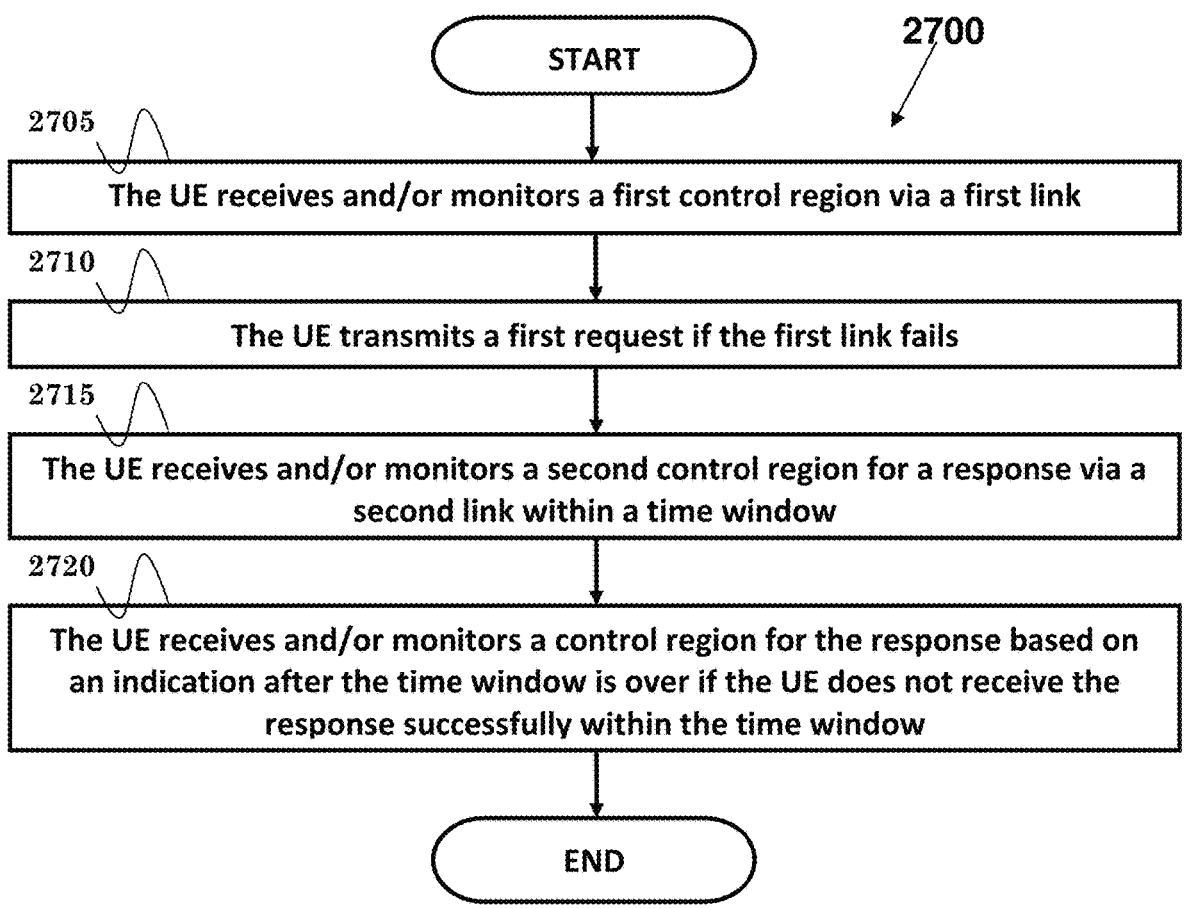
FIG. 27 is a flow chart according to one exemplary embodiment.

FIG. 27 is a flow chart 2700 according to one exemplary embodiment from the perspective of a UE. In step 2705, the UE receives and/or monitors a first control region via a first link. In step 2710, the UE transmits a first request if the first link fails. In step 2715, the UE receives and/or monitors a second control region for a response via a second link within a time window. In step 2720, the UE receives and/or monitors a control region for the response based on an indication after the time window is over if the UE does not receive the response successfully within the time window.

Referring back to FIGS. 3 and 4, in one exemplary embodiment of a UE, the device 300 includes a program code 312 stored in the memory 310. The CPU 308 could execute program code 312 to enable the UE (i) to receive and/or monitor a first control region via a first link, (ii) to transmit a first request if the first link fails, (iii) to receive and/or monitor a second control region for a response via a second link within a time window, and (iv) to receive and/or monitor a control region for the response based on an indication after the time window is over if the UE does not receive the response successfully within the time window. Furthermore, the CPU 308 can execute the program code 312 to perform all of the above-described actions and steps or others described herein.

In the context of the embodiments shown in FIGS. 24, 25, 26, and 27 and discussed above, in one embodiment, the UE could receive and/or monitor a control region for the response based on an indication in a time gap, after the time window is over and if the UE does not receive the response successfully within the time window. Furthermore, the UE could receive and/or monitor a control region for the response based on an indication until the time gap is over. The indication could indicate the first control region.

In one embodiment, the UE could receive and/or monitor the first control region for the response via the second link. The indication could indicate the second control region. The UE could receive and/or monitor the second control region for the response via the second link.

In one embodiment, the UE could receive and/or monitor the first control region for the response via the first link and the second control region for the response via the second link. Furthermore, the UE could receive and/or monitor the first control region for the response via the second link and the second control region for the response via the second link. The indication could indicate neither the first control region nor the second region. The indication could also indicate the UE does not receive and/or monitor any control region for the response.

In one embodiment, the UE receives and/or monitors the first control region for the response could mean the UE receives and/or monitors at least downlink control information or downlink transmission in the same time domain resources and/or the same frequency domain resources as that of the first control region. Alternatively, the UE receives and/or monitors the second control region for the response could mean the UE receives and/or monitors at least downlink control information or downlink transmission in the same time domain resources and/or the same frequency domain resources as that of the second control region.

In one embodiment, the indication could be a configuration from higher layer. Alternatively, the indication could be a MAC-CE or could be transmitted by a MAC-CE. The indication could also be a dynamic signaling or transmitted by a dynamic signaling, wherein the dynamic signaling can be DCI.

In the context of the embodiments shown in FIGS. 16 to 25 and discussed above, in one embodiment, the UE could receive and/or monitor the first control region via the first link for control signaling and/or data transmission transmitted from network. The UE could also receive and/or monitor the first control region via the first link for receiving/monitoring downlink control information, wherein the downlink control information comprises at least one of downlink assignment, uplink grant, CSI reporting triggering, and SRS triggering. The response may comprises at least one of downlink assignment, uplink grant, CSI reporting triggering, DL/UL RS transmission, DL/UL RS transmission triggering, and beam reporting triggering.

In one embodiment, the first and/or second link could be a radio link. The first and/or second link could also be at least one (DL) beam pair link. The first link could mean at least one beam pair link served for the UE or all beam pair links served for the UE. The second link could be at least one (DL) beam pair link in single carrier.

In one embodiment, the UE could identify the second link via measuring downlink reference signal. Furthermore, the UE could receive and/or measure the downlink reference signal for finding candidate beam(s). The downlink reference signaling may comprise a synchronization signal and/or a CSI-RS.

In one embodiment, the first link fails could mean that a beam failure has occurred, that all (serving) beam pair links of the UE have failed, or that all control channels of all (serving) beam pair links of the UE have failed. A beam pair link has failed if the quality of beam pair link(s) of an associated control channel falls low enough (e.g. comparison with a threshold, time-out of an associated timer).

In one embodiment, the UE could detect the first link as failed based on a metric or if the measured quality of the first link by the metric is below a threshold. The metric could be related to SINR or hypothetical BLER or RSRP.

In one embodiment, the first and/or second control region could be a CORSET or a search space. Furthermore, the first and/or second control region may comprise a set of PDCCH candidates or a set of frequency and time resources.

In one embodiment, the first control region could be a CORESET configured for monitoring downlink control signaling which may indicate DL assignment(s) and/or UL grant(s). The second control region could be a CORESET configured for monitoring the response after transmitting the first request. The first request could be a beam failure recovery request. The first request could comprise or indicate at least an ID or index of a downlink reference signal and/or an RSRP value associated with a candidate beam.

In one embodiment, the UE could detect or find the candidate beam based on the measurement of the downlink reference signal. The downlink reference signal could be spatially QCL'ed to the candidate beam.

In one embodiment, the UE could expect the network to use the candidate beam to transmit a response or downlink transmission to the UE after the first link is failed. The UE could use the same spatial filter to transmit the first request and/or receive the response as that to receive the downlink reference signal. The UE could also use the same spatial filter to receive the response as that to transmit the first request. The candidate beam could be the second link. The second link may comprise the candidate beam.

In one embodiment, the UE could receive and/or monitor the response after transmitting the first request. The response could be a beam failure recovery response or a gNB response.

In one embodiment, the UE could receive and/or monitor the response during the time window associated with the first request transmission. There may be a time offset between the transmission time (unit) of the first request and the starting time (unit) of the time window. The second control region or a second configuration associated with the second control region could be dedicated and/or configured to the UE for monitoring the response.

In one embodiment, if the UE receives the response, the UE could transmit an acknowledgement to network. The response could be scrambled by or addressed to an identity in a cell. The identity could be a C-RNTI. The response could be a DCI. The acknowledgement could be an uplink control signal (e.g. ACK/NACK) or an uplink transmission (e.g. PUSCH, PUCCH and PRACH) or a CSI reporting or a beam report.

In one embodiment, if the UE does not receive the response within the time window associated with the first request, the UE could trigger a second request transmission and/or could transmit a second request. The time gap could mean the time duration between the last time (unit) of the time window associated with the first request and the transmission time (unit) of the second request. The time gap could also mean the time duration between the last time (unit) of the time window associated with the first request and the transmission time (unit) of the second request and also the time offset between the transmission time (unit) of the second request and starting time (unit) of a time window associated with the second request. Furthermore, the time gap could mean the time duration between the last time (unit) of the time window associated with the first request and starting time (unit) of a time window associated with the second request.

In one embodiment, the second request could mean the next available transmission (opportunity) after the first request or the next available transmission (opportunity) after the time window associated with the first request.

In one embodiment, the UE does not receive the response in the time window could mean that the UE does not receive the response and a timer for the time window is expired. The timer for the time duration could start or restart if the UE transmits the second request. The first request and the second request could be transmitted via different link or different candidate beam or via the same link or the same candidate beam.

In one embodiment, the UE could reselect or re-determine another candidate beam for the second request. In one embodiment, the UE may not reselect or re-determine another candidate beam for the second request. The link could mean connection. The UE could be configured with a single carrier or cell, or with multiple carriers or cells. The time unit could mean any of slot, subframe, symbol, subslot, mini-slot, TTI, or shortened TTI.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
the UE receives and/or monitors a first control region via a first link, wherein the first control region is a search space or a CORESET (Control Resource Set) configured to monitor downlink control signaling which indicates one or more DL (Downlink) assignments and/or one or more UL (Uplink) grants;
the UE transmits a first request if the first link fails;
the UE receives and/or monitors a second control region for a response via a second link within a time window associated with the first request;
when the UE does not receive the response successfully within the time window associated with the first request, the UE transmits a second request and receives and/or monitors the second control region, for a response via a second link within a time window associated with the second request, wherein there is a time gap between a last time unit of the time window associated with the first request and a starting time unit of the time window associated with the second request; and
the UE receives and/or monitors downlink control signaling in the same time domain resources and/or in the same frequency domain resources of the first control region during the time gap after the time window associated with the first request is over.

2. The method of claim 1, wherein after the time window associated with the first request is over, the UE receives and/or monitors the first control region via the first link.

3. The method of claim 1, wherein after the time window associated with the first request is over, the UE does not receive and/or monitor the second control region via the second link.

4. The method of claim 1, wherein the second control region is a search space or a CORESET configured for monitoring gNB response after transmitting a beam failure recovery request.

5. The method of claim 1, wherein the first link includes at least one DL (Downlink) beam pair link in a single carrier.

6. The method of claim 1, wherein the first link fails means the quality of all associated control channels fall below a threshold.

7. The method of claim 1, wherein the first request and/or the second request is a beam failure recovery request indicating a downlink reference signal, wherein the UE detects and/or finds a candidate beam based on measurement of the downlink reference signal.

8. The method of claim 1, wherein the second link includes a candidate beam which is spatially QCL'ed with a downlink reference signal indicated by the first request.

9. A method of a network, comprising:
the network transmits downlink control signaling to a UE (User Equipment) in a first control region via a first link, wherein the first control region is a search space or a CORESET (Control Resource Set) configured to transmit downlink control signaling which indicates one or more DL (Downlink) assignments and/or one or more UL (Uplink) grants;
the network receives a first request from the UE;
the network transmits a response to the UE in a second control region via a second link within a time window associated with the first request; and
the network transmits at least downlink control signaling in the same frequency domain resources and/or the same time domain resources as that of the first control region and does not transmit the response in the second control region until reception of a second request or until starting time of a time window associated with a received second request, after the time window associated with the first request is over, wherein the network does not receive an acknowledgement successfully.

10. The method of claim 9, wherein the second control region is a search space or a CORESET configured for transmitting the response after receiving the first request.

11. The method of claim 9, wherein the first link includes at least one DL (Downlink) beam pair link in a single carrier.

12. The method of claim 9, wherein the second link includes a candidate beam which is spatially QCL'ed with a downlink reference signal indicated by the first request.

13. The method of claim 9, wherein the first request and the second request are a beam failure recovery request.

14. The method of claim 9, wherein the acknowledgement, comprising any of an uplink control signal, an uplink transmission, a CSI (Channel State Information) reporting, and/or a beam report, is responsive of the response.

15. A method of UE (User Equipment) monitoring, comprising:
monitoring at the UE a first control region via a first link, wherein the first control region is a search space or a CORESET (Control Resource Set) configured to monitor downlink control signaling which indicates one or more DL (Downlink) assignments and/or one or more UL (Uplink) grants;
transmitting from the UE a first request if the first link fails;
initiating a time window;
monitoring at the UE a second control region for a network response via a second link within the time window associated with the first request;
transmitting from the UE a second request if the network response is not received before the time window expires, with a time gap existing between the expiration of the time window associated with the first request and starting time of a time window associated with the second request or between the expiration of the time window associated with the first request and transmission time of the second request;
continuing monitoring at the UE for downlink control signaling in the same time domain resources and/or in the same frequency domain resources of the first control region during the time gap; and
monitoring at the UE the second control region for a second network response after the time gap.

16. The method of claim 15, wherein the first request and the second request are a beam failure recovery request.

* * * * *